United States Patent
Klefenz

(10) Patent No.: US 8,538,157 B2
(45) Date of Patent: Sep. 17, 2013

(54) DEVICE, METHOD AND COMPUTER PROGRAM FOR DETECTING CHARACTERS IN AN IMAGE

(75) Inventor: Frank Klefenz, Mannheim (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 860 days.

(21) Appl. No.: 12/519,407

(22) PCT Filed: Dec. 18, 2007

(86) PCT No.: PCT/EP2007/011132
§ 371 (c)(1),
(2), (4) Date: Jul. 6, 2009

(87) PCT Pub. No.: WO2008/074477
PCT Pub. Date: Jun. 26, 2008

(65) Prior Publication Data
US 2010/0054603 A1      Mar. 4, 2010

(30) Foreign Application Priority Data
Dec. 18, 2006  (DE) .................. 10 2006 059 659

(51) Int. Cl.
*G06K 9/18*     (2006.01)
*G06K 9/36*     (2006.01)
*G06T 11/20*    (2006.01)

(52) U.S. Cl.
USPC .................... 382/183; 382/281; 345/442

(58) Field of Classification Search
USPC ........................................... 382/183
See application file for complete search history.

(56) References Cited

U.S. PATENT DOCUMENTS

| | | | | |
|---|---|---|---|---|
| 4,757,551 A | * | 7/1988 | Kobayashi et al. | 382/170 |
| 5,367,578 A | * | 11/1994 | Golem et al. | 382/183 |
| 5,854,854 A | * | 12/1998 | Cullen et al. | 382/176 |
| 6,075,896 A | * | 6/2000 | Tanaka | 382/229 |
| 6,272,242 B1 | * | 8/2001 | Saitoh et al. | 382/187 |
| 6,683,983 B1 | * | 1/2004 | Shen et al. | 382/168 |

(Continued)

FOREIGN PATENT DOCUMENTS

| | | |
|---|---|---|
| DE | 32 38 300 A1 | 5/1983 |
| EP | 0 469 802 A2 | 2/1992 |
| FR | 2 661 999 A1 | 11/1991 |

OTHER PUBLICATIONS

Bennett et al., A method to detect and characterize ellipses using the Hough transform, Pattern Analysis and Machine Intelligence, IEEE Transactions on 21, No. 7, pp. 652-657, 1999.*

(Continued)

*Primary Examiner* — David Zarka
(74) *Attorney, Agent, or Firm* — Keating & Bennett, LLP

(57) ABSTRACT

A device for detecting characters in an image includes a Hough transformer implemented to identify, as identified elements of writing, circular arcs or elliptical arcs in the image or in a preprocessed version of the image. The device further includes a character description generator implemented to obtain, on the basis of the identified circular arcs or elliptical arcs, a character description which describes locations of the identified circular arcs or elliptical arcs. In addition, the device includes a database comparator implemented to compare the character description with a plurality of comparative character descriptions which have character codes associated with them, so as to provide, as a result of the comparison, a character code of a detected character.

28 Claims, 19 Drawing Sheets

(56) References Cited

U.S. PATENT DOCUMENTS

| | | | |
|---|---|---|---|
| 7,085,432 B2* | 8/2006 | Paquette | 382/281 |
| 2002/0094133 A1* | 7/2002 | Andreasson et al. | 382/284 |
| 2002/0097909 A1* | 7/2002 | Perrone et al. | 382/187 |
| 2002/0113797 A1* | 8/2002 | Potter et al. | 345/581 |
| 2003/0059115 A1* | 3/2003 | Nakagawa | 382/197 |
| 2005/0123203 A1* | 6/2005 | Heilper et al. | 382/229 |
| 2006/0039605 A1* | 2/2006 | Koga | 382/182 |
| 2006/0078200 A1* | 4/2006 | Koyama et al. | 382/181 |
| 2008/0012860 A1* | 1/2008 | Klefenz et al. | 345/441 |
| 2008/0063276 A1* | 3/2008 | Vincent et al. | 382/182 |

OTHER PUBLICATIONS

Chutatape et al., A modified Hough transform for line detection and its performance, Pattern Recognition 32, No. 2, 1999, pp. 181-192.*

Ho et al., A fast ellipse/circle detector using geometric symmetry, Pattern Recognition 28, No. 1, 1995, pp. 117-124.*

Srihari et al., Analysis of textual images using the Hough transform, Machine Vision and Applications 2, No. 3, 1989, pp. 141-153.*

Touj et al., Generalized hough transform for arabic optical character recognition, in Proceedings of the Seventh International Conference on Document Analysis and Recognition—vol. 2, IEEE Computer Society, Oct. 2003, pp. 326-333.*

Official Communication issued in International Patent Application No. PCT/EP2007/011132, mailed on May 16, 2008.

Brückmann et al.: "A Neural Net for 2D-Slope and Sinusoidal Shape Detection"; International Scientific Journal of Computing, pp. 21-25.

Ferrari et al.: "Object Detection by Contour Segment Networks"; European Conference of Computer Vision (ECCV), May 2006, 14 pages.

Amor et al.: "Multifont Arabic Characters Recognition Using Hough Transform and HMM/ANN Classification"; Journal of Multimedia; vol. 1, No. 2, May 2006, pp. 50-54.

Cheng et al: "Recognition of Handwritten Chinese Characters by Modified Hough Transform Techniques"; IEEE Transactions on Pattern Analysis and Machine Intelligence, vol. 11, Issue 4, Apr. 1989, pp. 429-439.

Fletcher et al.: "A Robust Algorithm for Text String Separation From Mixed Text/Graphics Images"; IEEE Transactions on Pattern Analysis and Machine Intelligence, vol. 10, Issue 6, Nov. 1988, pp. 910-918.

Chiu et al.: "A Proposed Circle/Circular Arc Detection Method Using the Modified Randomized Hough Transform"; Journal of the Chinese Institute of Engineers; vol. 29, No. 3, 2006, pp. 533-538.

Fakir et al.: "Recognition of Arabic Printed Scripts by Dynamic Programming Matching Method"; Ieice Transactions on Information and Systems, vol. E76-D, Issue 2, 1993, pp. 235-242.

Madhvanath et al.: "Contour-Based Image Preprocessing for Holistic Handwritten Word Recognition"; Proceedings of the 4th International Conference on Document Analysis and Recognition. (ICDAR); 1997, pp. 536-539.

Madhvanath et al.: "Chaincode Contour Processing for Handwritten Word Recognition"; IEEE Transactions on Pattern Analysis and Machine Intelligence, vol. 21, Issue 9, Sep. 1999, p. 928-932.

Amin: "Recognition of Hand-Printed Latin Characters Based on Generalized Hough Transform and Decision Tree Learning Techniques"; International Journal of Pattern Recognition and Artificial Intelligence, vol. 14, No. 3, 2000, pp. 369-387.

Amin et al: "Recognition of Hand Printed Latin Characters Using Machine Learning"; School of Computer Science and Engineering, Apr. 1996, pp. 51-61.

* cited by examiner

1st arc: downward
    position x, y; curvature radius r
2nd arc: to the right
    position x, y; curvature radius r
3rd arc: upward
    position x, y; curvature radius r 1st straight line section: to top right (angle 80° against horizontal)
    position x,y; length l 2nd straight line section: vertical (angle 90° against horizontal)
    position x,y; length l

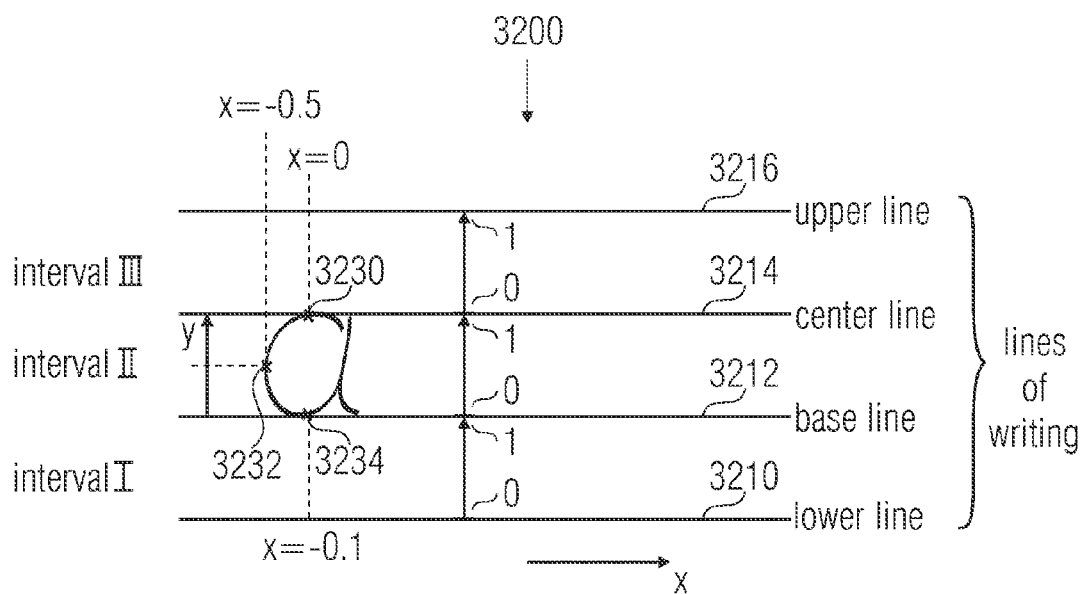

FIG 10A

→ arc: • direction (upward, downward, to left, to right)
  extreme:
  • position x
  • position y relative to lines of writing $$\begin{pmatrix} \text{interval I, interval II, interval III} \\ \text{on line of writing} \\ \text{additionally optionally more accurate description} \end{pmatrix}$$

• curvature radius (optional)
→ straight line section:
  • direction (e.g. angle against horizontal and/or against line of writing)
  • starting point and end point or length and center point

FIG 10B

3280
↓ example: "a"

arc 1: downward, extreme: x=0; on center line
    arc 2: to right, extreme: x=-0.5: interval II, y=0.5
    arc 3: upward, extreme: x=-0.1; on base line straight line section 1:  to top right, angle 80°
                               starting point x=0.4, interval II, y=0.2
                               end point x=0.5, on center line

DEVICE, METHOD AND COMPUTER PROGRAM FOR DETECTING CHARACTERS IN AN IMAGE

The present invention generally relates to a device, a method and a computer program for identifying a traffic sign in an image, specifically to character detection while using a Hough transform.

BACKGROUND OF THE INVENTION

A multitude of algorithms have already been known whose goal is to identify characters in an image, for example on a scanned page. In the method mentioned, templates describing known characters are directly compared to the image, for example. However, such a comparison of a template with an image is extremely costly in terms of computing expenditure. In addition, most known methods have a low level of reliability if different fonts are to be detected. Also, the detection of handwriting is particularly problematic since, as is known, there are huge differences between the different persons' handwriting.

SUMMARY

According to an embodiment, a device for detecting characters) in an image may have: a Hough transformer implemented to identify, as identified elements of writing, circular arcs or elliptical arcs in the image or within a preprocessed version of the image; a character description generator implemented to acquire, on the basis of the identified circular arcs or elliptical arcs, a character description which describes locations of the identified circular arcs or elliptical arcs; and a database comparator implemented to compare the character description with a plurality of comparative character descriptions which have character codes associated with them, so as to provide, as a result of the comparison, a character code of a detected character.

According to another embodiment, a method of detecting characters in an image may have the steps of: Hough transforming the image or a preprocessed version of the image so as to identify, as identified elements of writing, circular arcs or elliptical arcs in the image or in a preprocessed version of the image; producing a character description on the basis of the identified circular arcs or elliptical arcs, the character description describing locations of the identified circular arcs or elliptical arcs; and comparing the character description with a plurality of comparative character descriptions having character codes associated with them, so as to provide, as a result of the comparison, a character code of a detected character.

According to another embodiment, a method of detecting characters in an image may have the steps of: Hough transforming the image or a preprocessed version of the image to identify, as identified elements of writing, in the image or in the preprocessed image, a plurality of straight line sections which run through the image in different directions; producing a character description on the basis of the identified straight line sections, the character description describing locations of the identified straight line sections; and comparing the character description with a plurality of comparative character descriptions having character codes associated with them, so as to provide, as a result of the comparison, a character code of a detected character.

Another embodiment may have a computer program for performing the method of detecting characters in an image, wherein the method may have the steps of: Hough transforming the image or a preprocessed version of the image so as to identify, as identified elements of writing, circular arcs or elliptical arcs in the image or in a preprocessed version of the image; producing a character description on the basis of the identified circular arcs or elliptical arcs, the character description describing locations of the identified circular arcs or elliptical arcs; and comparing the character description with a plurality of comparative character descriptions having character codes associated with them, so as to provide, as a result of the comparison, a character code of a detected character, when the computer program runs on a computer.

Another embodiment may have a computer program for performing the method of detecting characters in an image, wherein the method may have the steps of: Hough transforming the image or a preprocessed version of the image to identify, as identified elements of writing, in the image or in the preprocessed image, a plurality of straight line sections which run through the image in different directions; producing a character description on the basis of the identified straight line sections, the character description describing locations of the identified straight line sections; and comparing the character description with a plurality of comparative character descriptions having character codes associated with them, so as to provide, as a result of the comparison, a character code of a detected character, when the computer program runs on a computer.

The present invention provides a device for detecting characters in the image. The device comprises a Hough transformer implemented to identify circular arcs (or circular arc segments) or elliptical arcs (or elliptical arc segments) in the image or in a preprocessed version of the image as identified elements of writing. The device further comprises a character description generator implemented to obtain, on the basis of the identified circular arcs or elliptical arcs, a character description which describes a location of the identified circular arcs or elliptical arcs. In addition, the device comprises a database comparator implemented to compare the character description with a plurality of comparative character descriptions which have character codes associated with them, so as to provide, as the result of the comparison, a character code of a detected character.

Alternatively, the Hough transformer is implemented to identify a plurality of straight line sections, running through the image in different directions, as identified elements of writing. In this case, the character description generator is implemented to obtain, on the basis of the identified straight line sections, a character description which describes locations of the identified straight line sections.

It is the core idea of the present invention that elements of writing, i.e. circular arcs, elliptical arcs or straight line sections, may be identified by a Hough transformer in a particularly advantageous manner, and that the locations of the elements of writing thus identified represent a characteristic character description which may efficiently be used for identifying the characters.

In other words, it has been found that identification of individual elements of writing, i.e. of arcs or straight line sections, enables efficient preprocessing. A character is broken down, by the identification of elements of writing performed within the Hough transformer, into a plurality of clearly defined individual elements, namely into a plurality of individual circular arcs, elliptical arcs, and/or straight line sections. This offers the possibility of describing characters by a small number of parameters, namely, for example, by means of the locations of the identified elements of writing. identified The elements of writing, or their location parameters, therefore represent forms of description which are suited for a particularly efficient database comparison.

For example, if a character consists of many thousands of image points, or pixels (e.g. 100 image points times 100 image points=10,000 image points), the character description produced in the inventive manner will only provide, e.g., a total of four location parameters of four arcs, for example when the character only comprises four arcs (e.g. "o", "s").

The location parameters of the identified elements of writing therefore are extremely well suited for efficient database comparison, and further represent characteristic information about a character. Specifically, various characters differ specifically in terms of the locations of the individual elements of writing (arcs and straight line sections).

In this respect it shall be noted that, e.g., a person, when he/she is writing down a character, composes the character of a plurality of (for example continuously or separately) successive elements of writing. However, it is precisely the shapes and locations of the elements of writing that are decisive for which character has been reproduced.

In addition it shall be noted that, by using a Hough transform, detection of characters in scanned originals of low quality may be improved considerably as compared to conventional methods. For example, a Hough transformer is able to detect even such line-shaped curves as a coherent curve which comprise comparatively short interruptions. However, specifically in the reproduction of handwriting, it is not rare for characters to be interrupted. For example, if a sheet of paper full of writing is scanned at a low resolution, it may occur that individual lines (particularly thin lines) are not fully reproduced. A Hough transformer is capable of detecting elements of writing (e.g. bent lines or straight line sections) even when they are interrupted. Thus, the inventive concept of detecting characters is not considerably impaired even by poor reproduction of characters in the image.

In addition, it shall be noted that by using a Hough transformer, documents prepared by means of typewriters may also be processed in a particularly reliable manner since elements of writing may be reliably detected, by the Hough transformer, even if there are interrupted lines. Especially with texts prepared using typewriters, it happens that individual types of typewriters are unevenly worn, and that, e.g., some lines are interrupted.

Thus, two essential advantages are achieved by utilizing a Hough transformer for detecting characters. On the one hand, the information provided by the Hough transformer about detected elements of writing is particularly reliable and meaningful information which enables efficient database comparison. On the other hand, any disturbances in the characters, e.g. interruptions of a line of writing, are essentially offset by utilizing a Hough transformer, so that reliable detection of writing is possible even in the event of poor originals.

In an advantageous embodiment of the present invention, the Hough transformer is implemented to identify both circular arcs or elliptical arcs and straight line sections as identified elements of writing. In this case, the character description generator is advantageously implemented to utilize both the identified circular arcs or elliptical arcs and the identified straight line sections for detection of writing.

Such an embodiment of the inventive device for detecting characters will be particularly advantageous if the writing to be detected contains both arcs and straight line sections.

However, in cases where specific writings, or fonts, contain only arcs or straight line sections (which is the case with some computer fonts), detection of either circular arcs or straight line sections will suffice.

In a further advantageous embodiment, the character description generator is implemented to obtain, as the character description, a description of a character which describes the character as an ordered description of identified elements of writing. If, thus, the individual elements of writing are made to have a predetermined order in accordance with a predefined arrangement rule, a database comparison may be performed in a particularly efficient manner.

In an advantageous embodiment, the character description generator is implemented to order the character description such that the ordered identified elements of writing describe a continuous line of writing. In this case, the arrangement of the character description corresponds to a natural sequence of a manner in which a character is reproduced by a person, for example. The corresponding description is typically unambiguous, since a person writes down a character in a specific sequence. Thus, the described implementation of the character description generator in turn results in a particularly efficient and typically unambiguous character description, as a result of which the database comparison performed in the database comparator may be conducted in a highly efficient manner.

In a further advantageous embodiment, the inventive device comprises a line-of-writing detector implemented to identify, on the basis of locations of the elements of writing identified by the Hough transformer, a line along which the characters are arranged. It has been found, specifically, that characteristic points of the elements of writing identified by the Hough transformer (for arcs: e.g. extreme points; for straight line sections: for example end points) typically run along lines which are characteristic in the typeface. Thus, there is a very simple and efficient possibility of further exploiting the information provided by the Hough transformer in order to obtain additional information about the typeface.

In a further advantageous embodiment, the character description generator is implemented to generate the character description such that the character description describes information about locations of the identified elements of writing in relation to at least one detected line of writing. It has been found, specifically, that locations of the elements of writing in relation to lines of writing (for example a lower line, a base line, a center line or an upper line of the writing) provides an even more meaningful form of description, so that the reliability of the detection of writing may be improved. The description of the locations of the elements of writing in relation to at least one line of writing enables the character description to directly express whether characters have descenders or ascenders, for example. Using this information, particularly reliable identification of the characters may be conducted.

In a further advantageous embodiment of the present invention, the device comprises a connectivity number calculator implemented to calculate a Euler connectivity number on the basis of an image content of an image section of the image which comprises a character. Advantageously, the device will then also comprise a connectivity number examiner implemented to compare the Euler connectivity number, which has been calculated for the image section, to a predetermined comparative connectivity number which is contained in a database and is associated with a character detected in the image section. Thus, reliability information may be obtained which carries information about the reliability of detecting a character. Thus, some detection errors in writing detection may be identified by using the Euler connectivity number, whereupon a user of the inventive device may be warned, for example, or whereupon renewed, refined detection of a character may take place.

In addition, the present invention provides corresponding methods of detecting characters in an image.

Moreover, further advantageous embodiments of the present invention are defined by the dependent patent claims.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which:

FIG. 10a shows a graphical representation of a character "a" within a line system consisting of a lower line, a base line, a center line and an upper line;

FIG. 10b shows a representation of an exemplary description of a character;

FIG. 10c shows a representation of an exemplary description of the character "a" shown in FIG. 10a;

DETAILED DESCRIPTION OF THE INVENTION

Figure 6:
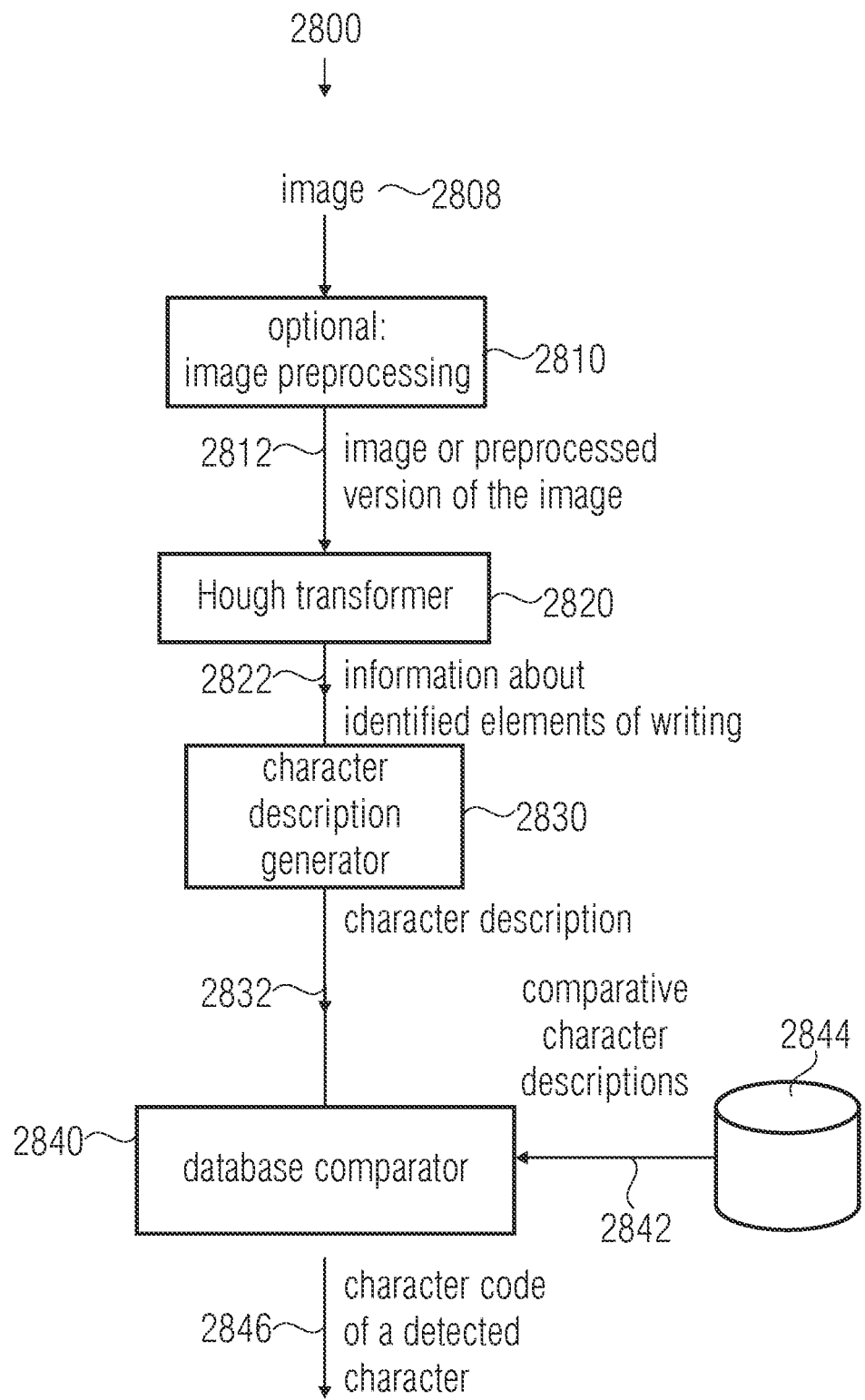
FIG. 6 shows a block diagram of an inventive device for detecting characters in an image in accordance with an embodiment of the present invention.

FIG. 6 shows a block diagram of an inventive device for detecting characters in an image. The device according to FIG. 6 is designated by 2800 in its entirety. The device 2800 is advantageously implemented to receive an image 2808. The device 2800 optionally includes an image preprocessing 2810 implemented to generate a preprocessed version 2812 of the image from the image 2808. The device 2800 further includes a Hough transformer 2820 implemented to receive the image 2808 or the preprocessed version 2812 of the image and to identify elements of writing in the image 2808 or in the preprocessed version 2812 of the image. According to one embodiment of the present invention, the Hough transformer 2820 is implemented to identify arcs of a circle or arcs of an ellipse in the image 2808 or in the preprocessed version 2812 of the image as identified elements of writing.

In another advantageous embodiment, the Hough transformer 2820 is implemented to identify a plurality of straight line sections running from different directions through the image 2808 or through the preprocessed version 2812 of the image as the identified elements of writing.

In a further embodiment, the Hough transformer 2820 is implemented to identify both arcs of a circle or arcs of an ellipse on the one hand and also straight line sections on the other hand in the image 2808 or in the preprocessed version 2812 of the image, respectively, as identified elements of writing. The Hough transformer 2812 is further implemented to provide information 2822 on the identified elements of writing to a character description generator 2830.

The character description generator 2830 is implemented to obtain a character description 2832 describing a position of the identified elements of writing based on the identified elements of writing, i.e. based on the identified arcs of a circle or arcs of an ellipse, and/or based on the identified straight line sections.

A database comparator 2840 is implemented to receive the character description 2832 from the character description generator 2830 and to compare the character description 2832 to a plurality of comparative character descriptions 2842. Advantageously, character codes are associated with the comparative character descriptions 2842, which may, for example, be stored in a database 2844. The database comparator 2840 is implemented to provide a character code 2846 of a detected character between the character description and the plurality of comparative character descriptions.

Based on the structural description of the device 2800 above, in the following the functioning of the device 2800 will be explained in more detail.

In this respect it is to be noted that the Hough transformer 2820 is preferably implemented to detect different character and/or elements of writing, e.g. arcs of a circle and/or arcs of an ellipse and/or straight line sections in the image 2808 or in the preprocessed version 2812 of the image. In this respect it is to be noted that a Hough transformer is able to detect straight or bent lines as a whole due to its functioning, even if the lines are interrupted. Here, it is only necessary for the interruptions of the lines not to be too long. This is achieved by a Hough transformer, for example by bending inclined or bent lines into a straight line step by step, wherein the straight line is detected then. A detection of a straight line is typically especially simple, as for detecting a straight line it only has to be checked how many image points exist along a straight line. If the number of image points along a straight line is greater than a predefined minimum number, it may be assumed that a straight line exists, even if not all points along the straight line exist. If, however, less than a predefined number of points along a straight line are present, it may be assumed that no line in present in an image.

A Hough transformer generally speaking is an especially reliable means to detect also non-continuous lines running along a predefined curve (i.e. for example along an arc of a circle, an arc of an ellipse or an inclined line) as a whole, even if short interruptions exist.

Further, due to its operating principle, a Hough transformer provides information at least regarding one location of the identified line-shaped elements (arcs of a circle and/or arcs of an ellipse and/or straight line sections).

The information provided by the Hough transformer typically also includes, in addition to positional information, information about a course of the identified element of writing, for example information about a direction of an identified straight line section or information about a curvature radius of an identified arc of a circle or arc of an ellipse.

It is further noted that the Hough transformer typically also provides information about an extreme point of an arc of a circle or arc of an ellipse, i.e. about a point which is located farthest in a certain direction, in the detection of an arc of a circle or an arc of an ellipse.

In summary, it may generally be noted that a Hough transformer provides a plurality of parameters describing a location of individual elements of writing, wherein elements of writing having short interruptions are described as one single continuous element of writing. Thus, by the use of a Hough transformer, the problem of conventional means for character detection is prevented, that, when the slightest interruptions exist in the typeface, a fragmentation of the characters into a plurality of individual components occurs directly. The use of a Hough transformer, on the contrary, brings a substantial measure of insensitivity against such interferences.

The character description generator 2830 thus receives a description of a very limited number of individual elements of writing from the Hough transformer (arcs of a circle or arcs of an ellipse on the one hand and/or straight line sections on the other hand).

From the limited number of elements of writing identified by the Hough transformer, either describing arcs of a circle to which a certain sufficient number of image points belong, or describing straight line sections to which a sufficient number of image points belong, the character description generator generates a compact character description describing the identified arcs of a circle or arcs of an ellipse. In other words, by the character description generator 2830 an especially advantageous description of characters is formed, including location parameters and/or further parameters, e.g. curvature parameters with arcs of a circle or arcs of an ellipse and direction parameters with straight line sections. Thus, a character is all in all described by its natural components, i.e. by a sequence of arcs (arcs of a circle/arcs of an ellipse) and/or straight line sections.

The identified basic elements of a font, or writing, thus correspond to a form of description using which a human user might describe a character unknown to him in an efficient way. Thus, the character description 2832 provided by the character description generator 2830 represents an efficient description of a character existing in the image 2808 or in the preprocessed version 2812 of the image, respectively, wherein the description advantageously only includes such elements which are identified by the Hough transformer 2820.

By an adaptation of the Hough transformer to characteristics of different fonts, the inventive device 2800 may thus be adapted to different fonts in a simple and efficient way. If a font for example mainly consists of round elements, as it is the case with German script or some computer fonts, the Hough transformer 2820 may in particular be adapted to the detection of arcs of a circle of different curvature radii, whereby in the information 2822 provided by the Hough transformer 2820 mainly (or, alternatively, exclusively) a description of arc-shaped elements of writing is contained.

If a font is, however, a font which basically includes straight lines, as is, for example, the case with some computer fonts, the Hough transformer 2820 may be implemented to advantageously (or, alternatively, exclusively) detect straight lines of different directions.

Thus, the character description generator 2830 advantageously contains information about the substantial features of the currently processed font. Thus, the character provider 2830 only has to generate a representation of the information 2822 provided by the Hough transformer 2820 which may be processed by the database comparator. By this, the character description generator 2833 may be realized with a comparatively low effort.

As the subsequent database comparison via the database comparator 2840 is based on a description of the basic elements (arcs of a circle/arcs of an ellipse and/or straight line sections), the comparison may also take place in an efficient way. The reason for this is, among others, that typical characters only contain a very limited number of characteristic character elements. Thus, a font may be described by especially few features, for example by the features and/or parameters of the characteristic elements of writing. A low number of elements to be used for the database comparison results in a very efficient realization of the database comparator, whereby the computational power may be kept low and the character detection may take place very rapidly.

Apart from that it is to be noted that the characters may already be narrowed down extremely by the presence of a certain number of different elements of writing. In other words, if a number of different elements of writing is known (arcs of a circle/ellipse and/or straight line section), only a very limited number of characters are possible. By such a pre-selection, the database comparison executed by the database comparator 2840 may be made substantially more efficient than is usually the case.

In summary it may thus be determined, that the device 2800 enables especially efficient character detection due to the fact that only characteristic elements of writing are detected by the Hough transformer, whereby strongly information-compressed information 2822 results, based on which an expressive character description 2832 may be generated with little effort. Thus, a high efficiency results, and further a high reliability of the database comparison executed by the database comparator 2840.

Details with regard to the individual means of the device 2800 are explained more explicitly in the following.

Figure 7:
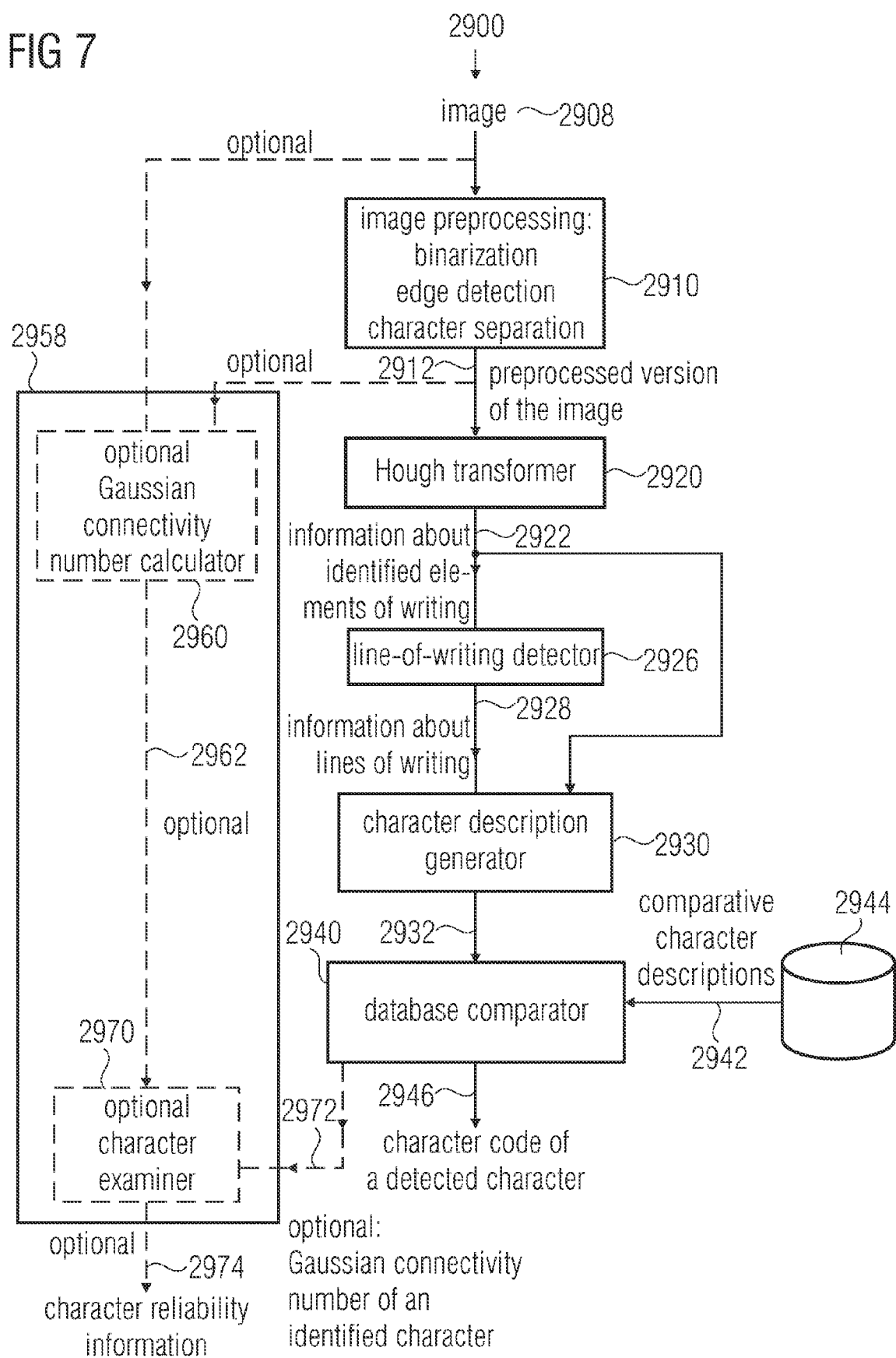
FIG. 7 shows a block diagram of an inventive device for detecting characters in an image in accordance with an embodiment of the present invention.

FIG. 7 shows a block diagram of an extended device for detecting characters in an image. The device of FIG. 7 is designated by 2900 in its entirety.

The device 2900 is implemented to receive an image 2908 which basically corresponds to the image 2808. The device 2900 further includes an image preprocessing 2910 which basically corresponds to the image preprocessing 2810. The image preprocessing 2910 includes, in a advantageous embodiment, one or several of the following functionalities: binarization, edge detection, character separation.

The image preprocessing 2910 thus provides a preprocessed version 2912 of the image which basically corresponds to the preprocessed version 2812 of the image.

It is to be noted that the image preprocessing may, for example, be implemented to receive the image 2908, convert the same into a gray level image (as far as the image 2908 is not yet present as a gray level image), and then apply a threshold value to the gray level values. Depending on whether a gray level value of an image point is greater than or smaller than a default or adaptively set threshold value, an associated image point in the preprocessed version 2912 of the image is set to a first value and/or color value or to a second value and/or color value. Thus, for example from the image 2908 an associated monochrome image results.

In a advantageous embodiment, the threshold value used for binarization is set depending on a histogram distribution of gray levels in the image 2908 and/or in a gray level version of the image 2908. In another embodiment, however, also a fixedly predefined threshold value may be used. If a new image is recorded, in a advantageous embodiment the threshold value used for binarization is readjusted.

It is further to be noted that a binarization may in a further, advantageous embodiment be executed without an intermediate step of converting the image 2908 into a gray level image, if, for example, threshold values are directly applied to the different color intensities.

In a further advantageous embodiment, the image preprocessing 2910 for example includes an edge detection in addition to binarization. By the edge detection, for example edges in the monochrome image generated by the binarization are detected. In other words, transitions between the two colors in the monochrome image are e.g. marked as edges. This is especially advantageous, as a Hough transformer may deal especially well with an edge image.

Apart from that, it is to be noted that the edge detection may also take place directly using the image 2908, i.e., for example without the use of a binarization.

In a further, advantageous embodiment, the image preprocessing 2910 further includes a character separation. Here, individual characters are separated. If, for example, different identified edge comprise a distance which is greater than a predefined distance, it is, for example, assumed that two separate characters exist. It is, for example, advantageous when characters are in principle separated from each other by a minimum distance. Thus, by a character separation, for example from one image a plurality of image sections results, wherein each image section advantageously only includes one individual character.

It is to be noted that different approaches exist for character separation which are not to be explained in detail here.

All in all, by image preprocessing 2910 thus a preprocessed version 2912 of the image 2909 results. The device 2900 further includes a Hough transformer 2920. The Hough transformer 2920 fulfils the same function as the Hough transformer 2820 which was described with reference to FIG. 28. Thus, at the output of the Hough transformer 2920 information about identified elements of writing is available, wherein the identified elements of writing may be arcs of a circle, arcs of an ellipse and/or straight line sections.

The device 2900 further includes a line-of-writing detector 2926. The line-of-writing detector 2926 receives the information 2922 about identified elements of writing provided by the Hough transformer 2920 and is implemented to provide information 2928 about lines of writing in the image 2908 or, respectively, in the preprocessed version 2912 of the image.

The line-of-writing detector 2926 is here implemented to detect, based on the information 2922 on identified elements of writing provided by the Hough transformer 2920, lines in the image, on which an excessively large number of extremes of arcs of a circle or arcs of an ellipse are located and/or on which an especially large number of straight line sections end.

Details with regard to the functionality of the line-of-writing detector 2926 are described later with reference to FIGS. 31 and 32.

Apart from that, it is to be noted that the line-of-writing detector 2926 may optionally also be omitted.

The device 2900 further includes a character description generator 2930 which in its function basically corresponds to the character description generator 2830. The character description generator 2930 is, however, in one preferred embodiment, in which the line-of-writing detector 2926 is present, configured to use both information 2928 about lines of writing in the image provided by the line-of-writing detector 2926 and also information 2922 on identified elements of writing provided by the Hough transformer 2920 in order to generate a character description 2932.

The character description generator 2930 is here advantageously implemented to generate the character description 2932 so that the character description 2932 describes a relative position of elements of writing described by the information 2922 with regard to the lines of writing described by the information 2928.

Thus, an especially advantageous character description 2932 results, in which the lines of writing to be described in more detail are considered. The corresponding character description 2932 which considers information about the lines of writing 2928, and which indicates the parameters of the identified elements of writing 2922, advantageously in relation to the identified lines of writing, is thus insensitive with regard to a rotation or a dimensional scaling of the characters.

The device 2900 further includes a database comparator 2940 which receives the character description 2932 and with regard to its function basically corresponds to the database comparator 2840 of the device 2800. The database comparator 2940 is thus advantageously coupled to a database 2944 to receive comparative characters 2942. The database comparator 2940 apart from that provides a character code 2946 of a detected character.

In an advantageous embodiment, the device 2900 further includes an optional means 2958 for checking the reliability of an identified character. The means 2958 for checking the reliability of an identified character includes a Euler connectivity number calculator 2960. The Euler connectivity number calculator 2960 either receives the image 2908 or the preprocessed version 2912 of the image and thus provides Euler connectivity number information 2962 including a Euler connectivity number of an image content of the image 2908 or the preprocessed version 2912 of the image. The Euler connectivity number is, moreover, sometimes referred to as the Euler characteristic in the literature and describes a difference between a number of objects in the image (or in the preprocessed version of the image) and a number of holes or enclosed areas in the image. Further details with regard to the calculation of the Euler connectivity number which is executed by the Euler connectivity number calculator 2960 are to be described in the following.

The device 2958 for determining the reliability of the character detection further includes a character examiner 2970 coupled to the Euler connectivity number calculator 2960 to receive the Euler connectivity number 2962. The character examiner 2970 is further coupled to the database comparator 2940 to obtain a comparative Euler connectivity number 2972 belonging to a detected character. The comparative Euler connectivity number 2972 is here provided by the database comparator 2940 based on an entry in the database. The character examiner 2970 is further implemented to provide character reliability information 2974. Here, the character examiner 2970 is advantageously implemented to indicate the high reliability of a detected character when the actual Euler connectivity number 2962 determined by the Euler connectivity number calculator 2960 from the image 2908 or from the preprocessed version 2912 of the image, respectively, corresponds to the comparative Euler connectivity number 2927 taken from the database 2944 which belongs to an identified character. In contrast to that, by the character reliability information 2974, the character examiner 2970 advantageously indicates a low reliability of an identified character when a deviation between the actual Euler connectivity number 2962 and the comparative Euler connectivity number 2972 exists.

In the following, a procedure in the detection of characters is explained with reference to FIGS. 30a, 30, 31, 32a, 32b, 32c, 33, 34 and 35.

Figures 8A, 8B:
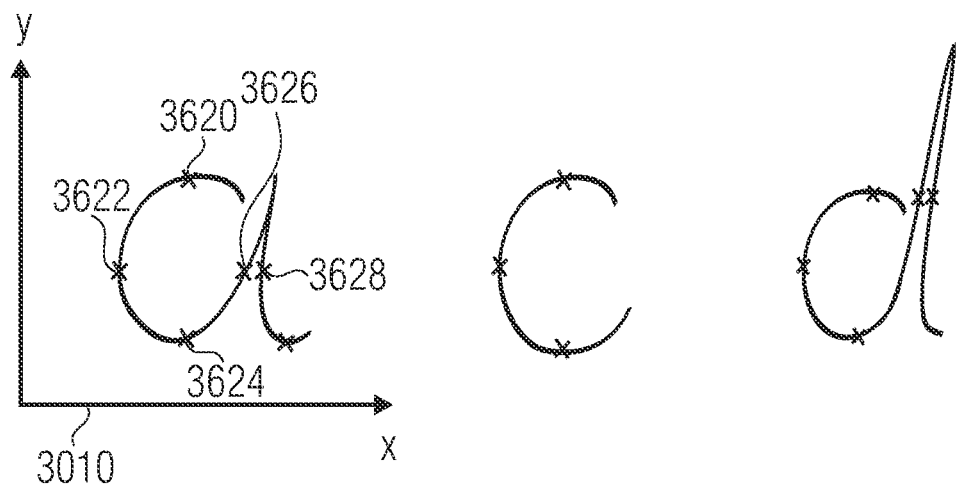
FIG. 8a shows a graphical representation of three characters "a" "c" "d"
FIG. 8b shows a representation of a character description of the character "a"

FIG. 8a in this respect shows a graphical representation of three characters "a" "c" "d". In the characters "a" "c" "d" here, for example, extreme points of arcs of a circle or arcs of an ellipse, respectively, are indicated as well as center points of straight line sections. The mentioned points are designated by "x". It is to be noted that an extreme point of an arc is a point of the arc which is farthest in a predefined direction. If it is assumed that the characters are plotted in an (e.g. rectangular) x-y coordinate system, then the extreme points of arcs are, for example, points of the arcs which are farthest in the positive x direction, negative x direction, positive y direction and negative y direction. An x-y coordinate system is, moreover, designated by 3010 in FIG. 8.

Further, an extreme point of a first (upper) arc of the letter "a" is designated by 3620. An extreme point of a second left arc is designated by 3622. An extreme point of a third, lower arc is designated by 3624. A center point of a first straight line section is designated by 3626, and a center point of a second straight line section is designated by 3628. It is to be noted that an arc is a section of an at least approximately circular or ellipse-shaped line. In other words, the Hough transformer detects that a course of line of the character "a" is approximated in an environment of the first extreme point 3620 by an arc of a circle or an arc of an ellipse, and that further a course of line of the letter "a" is, for example, approximated in an environment of the line center point 3626 by a straight line section.

Just like with the letter "a", also for letters "c" and "d" corresponding extreme points of approximation circular arcs and/or approximation elliptical arcs as well as center points of approximation line sections are marked by an "x".

FIG. 8b shows a tabular illustration of a simple description of letter "a". Here, it is assumed that the Hough transformer 2830 of the device 2800 and/or the Hough transformer 2930 of the device 2900 may, for example, identify a location of an extreme point of different curved lines and may further identify a location of a center point of different curved lines.

Thus, for letter "a", according to FIG. 8a three arcs and two straight line sections are identified. The description of letter "a" according to FIG. 30b thus includes a description for the three arcs and for the two straight line sections. The first arc around the extreme point 3620 is an arc that is curved downward, so that the associated description, for example, includes an attribute and/or a parameter indicating a downward curvature. Further, the description advantageously includes information about a position of the extreme point 3620. The position may advantageously be indicated by associated coordinates x, y. The description of the first arc around the extreme point 3620 further optionally includes an indication of a curvature radius r of the first arc.

Similarly, a description of a second arc approximating character "a" in a surrounding of the second extreme point 3622 includes information about the fact that the arc comprises a curvature to the right. The description of the second arc may again indicate a position of the second extreme point 3622 in the form of coordinates x, y and optionally information about a curvature radius r of the second arc. A corresponding description may also be given for the third arc approximating the letter "a" in a surrounding of the third extreme point 3624, as is illustrated in FIG. 30b. It is to be noted, however, that the arcs approximating letter "a" at the extreme points 3620, 3622, 3624 may also be described by other parameters.

Apart from that it is to be noted that an extreme is advantageously a local extreme which needs not necessarily be a global extreme.

For the two straight line sections of letter "a", for example by the Hough transformer 2820, 2920, information about a direction may be provided. Thus, the description of the first straight line section with the center point 3626 may, for example, indicate that the first straight line section goes to the top right. The description may further optionally indicate the angle under which the line section is inclined as compared to a horizontal. Further, the description may, for example, indicate the position of the center point 3626 of the corresponding line section by the coordinates x, y. Further, the description of the first straight line section may include information about the length of the first straight line section in the form of a parameter 1. Alternatively, however, also other parameters may be used for the description, for example the coordinates of a starting point or an end point.

FIG. 8b shows two descriptions of the straight line sections, the first straight line section with the center point 3626 and the second straight line section with the center point 3628. Thus, it may be seen from FIG. 8b that, based on the information provided by the Hough transformer 3820, 2920, an efficient description of a character may be generated.

In the following it will be described, how the information provided by the Hough transformer may be further processed for a comparison in the database comparator 2840, 2940, to obtain a more favorable illustration of the information 2822, 2922 about identified elements of writing. It is to be noted, however, that, in a simplified embodiment, the information provided by the Hough transformer 2820, 2920 may also be directly supplied to a database comparator 2840.

Figure 9:
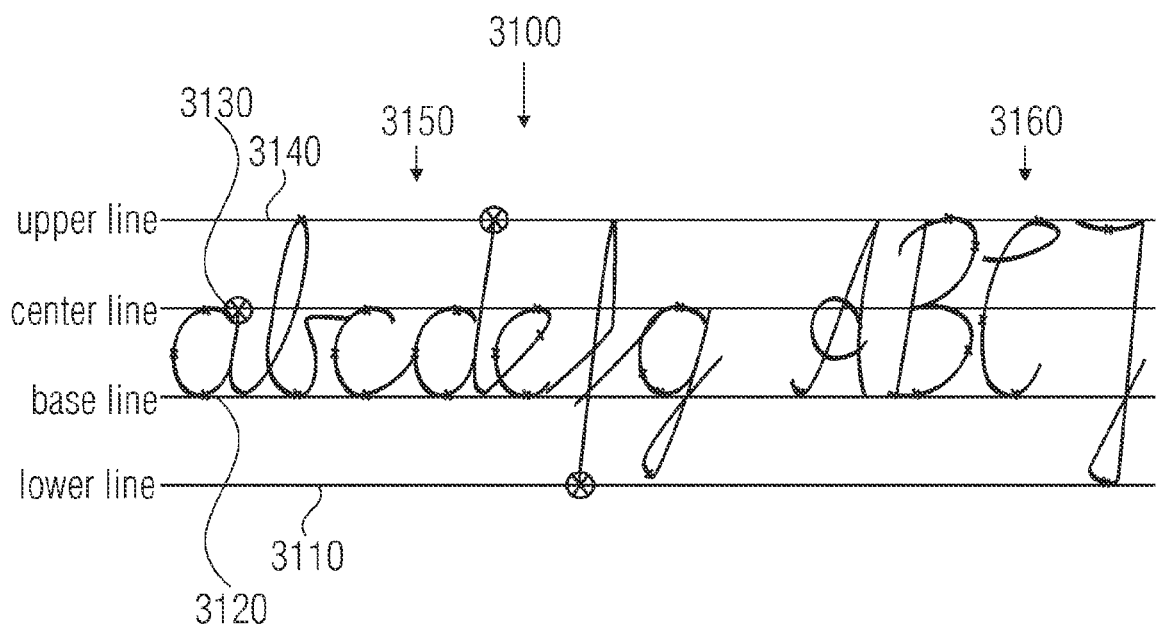
FIG. 9 shows a graphical representation of a sequence of contiguous characters and of a lower line, base line, center line and upper line which occur within the typeface.

FIG. 9 shows a graphical representation of characters in German script and of associated lines of writing. The graphical representation of FIG. 9 is designated by 3100 in its entirety. The graphical representation 3100 shows four characteristic lines of writing, i.e. a lower line 3110, a base line 3120, a center line 3130 and an upper line 3140. Further, the schematic illustration 3100 shows a lettering "abcdefg" 3150 and four capital letters "ABCJ" 3160. From the graphical representation 3100 it may be seen that the lower-case letters "a", "c" and "e" at least ideally lie between the base line and the center line and touch these lines. The lower-case letters "b" and "d" as well as the capital letters "A", "B" and "C" lie between the base line 3120 and the upper line 3140 and typically touch the base line 3120 and the upper line 3140. The letter "f", however, lies between the lower line and the upper line and touches the lower line 3110 and the upper line 3140. The same holds true for the upper case letter "J".

In the graphical representation 3100, apart from that extreme points of arcs contained in the letters (e.g. of arcs of a circle or of an ellipse) are marked with an "x". Further, the end points of straight line sections are marked with "⊕". From the schematic illustration 3100, it may be seen that along the lines of writing 3110, 3120, 3130, 3140 an especially large number of extreme points of arcs occur. Further, there is an especially large number of end points of straight line sections on the lines of writing. It is thus understandable that a line-of-writing detector 2926 may detect a line of writing by searching for a straight line on which there is an especially large number of extreme points of arcs and/or an especially large number of end points of straight line sections. For determining the lines of writing, the line-of-writing detector 2926 may thus advantageously use the information 2922 provided by the Hough transformer 2960 regarding extreme points of arcs and/or the information regarding end points of a straight line sections provided by the Hough transformer 2920. Based on the mentioned information, the line-of-writing detector 2926 determines lines along which an accumulation of extreme points of arcs and/or of end points of straight line sections occurs.

Thus, the line-of-writing detector 2926 for example provides information about a position of the lines of writing 3110, 3120, 3130, 3140, i.e., for example, about a position and/or a direction of the mentioned lines of writing as information 2928.

The line-of-writing detector may, apart from that, be implemented to additionally use a pre-knowledge about the position of the lines of writing with regard to each other (for example with regard to the fact that the lines of writing are parallel to each other and have certain relative spacings) to determine the lines of writing.

In the following, it is described with reference to FIGS. 10a, 10b and 10c how an especially advantageous character description may be determined by describing the position of the extremes relative to the determined lines of writing. For this purpose, FIG. 10a shows a graphical representation of a character "a" in a line system consisting of a lower line, a base line, a center line and an upper line. The graphical representation according to FIG. 10a is designated by 3200 in its entirety. The graphical representation 3200 shows a lower line 3210, a base line 3212, a center line 3214 and an upper line 3216. A character "a" is here arranged between a base line and a center line. The character "a" is designated by 3220 in its entirety. A first, top arc of the character "a" comprises an extreme 3230. The extreme 3230 in the example of FIG. 10a is located on the center line 3214. It may be assumed here, that the extreme 3230 is at least approximately located on the center line and/or is regarded to be located on the center line, when a distance of the extreme 3230 from the center line is smaller than a predefined threshold which is indicated either absolutely (in terms of an absolute distance) or relatively (depending on a distance between two base lines). Here, for example, basically arbitrarily an x coordinate (x=0) is associated with the extreme 3230 of the first arc.

The character "a" includes a second, left arc whose extreme 3232 lies between the base line 3212 and the center line 3214. Further, an x coordinate (x=−0.5) is associated with the second extreme 3232, describing a position (or a horizontal position or x position, respectively) relative to the first extreme 3230 selected as a reference point. The character "a" further includes a third, bottom arc whose extreme 3234 is located on the base line 3212. In other words, a distance of the third extreme 3234 from the base line 3212 is smaller than a predefined threshold, wherein the predefined threshold may again be determined and/or predefined as an absolute value or as a relative value (depending on a distance between two lines of writing).

Further, also the third extreme 3232 comprises an x coordinate describing a position relative to the reference point. In the illustrated example, the following applies: x=−0.1.

Similar information may, moreover, also be given for the further components of character "a" (and for all other characters), for example for the right approximately straight line section of the character "a".

It is further to be noted that for example a range between the lower line 3210 and the base line 3212 may be defined as a first interval (interval I). A range between the base line 3212 and the center line 3214 may further be defined as a second interval (interval II). A range between the center line 3214 and the upper line 3216 may further be defined as a third interval (interval III).

It is further to be noted that, depending on a distance of the lines of writing confining the interval, a value between 0 and 1 may be associated with a position within an interval, wherein the value describes a vertical position or a relative y position, respectively. In other words, if a certain point (e.g. an extreme point of an arc, a starting point of a straight line section, a center point of a straight line section or an end point of a straight line section) is located within an interval, a relative position coordinate of approximately 0 may, for example, be associated with this point when the point is located at the beginning of an interval, and further a relative position coordinate of approximately 1 may be associated with the point, when the point is, for example, located close to the end of the interval. If, for example, a corresponding point lies between the base line and the center line, but very close to the base, then, for example, a location parameter of zero is associated with the point. If the point lies between the base line and the center line, however, but close to the center line, for example a location parameter of approximately 1 may be associated with the point. Apart from that, for example a location parameter of 0.5 may be associated with a point which is located in the middle between the base line and the center line. However, one need not necessarily select a linear association of the location parameters. Also a boundary of the location parameters to an interval between 0 and 1 need not be used, but is only to be regarded as an example. Rather, it is a general advantage in one embodiment of the present invention that relative location parameters are associated with points (extreme points of arcs, starting points of straight line sections, end points of straight line sections or center points of straight line sections) which are related to the base lines.

With reference to FIG. 10b, in the following an exemplary form of description for a character is given. For an arc (i.e., for example, an arc of a circle or an arc of an ellipse) the description may comprise information about the direction which indicates whether the arc is curved upward, downward, to the left or to the right. Further, the description for an arc may include information about a position of an extreme. The position of the extreme may, for example, be indicated as an absolute or relative position in a first direction (for example in a direction along the lines of writing, which is also designated as the x direction). Alternatively, however, also relative information about a position in the x direction may be given, for example indicating a position with regard to a point of comparison in the character. The point of comparison is, for example, an arc, a starting point of a straight line section, an end point of a straight line section or a center point of a straight line section. Likewise, the reference point may, however, also be an otherwise selected characteristic point of a character, for example a center point, a point which is farthest in a certain direction or another characteristic point. Further, the description of an arc advantageously includes information about a position y relative to the lines of writing 3210, 3212, 3214, 3216. The information about the position relative to the lines of writing may, for example, indicate whether the point in an interval is located between two lines of writing (within a predefined tolerance) or on a line of writing. Further, the information may optionally indicate in what interval between the lines of writing the point is given.

Additionally or alternatively, the information about the position relative to the lines of writing may contain formation about whether a point (for example within a predefined tolerance range) lies on one of the lines of writing and, if yes, on which of the lines of writing the point is located. Additionally, optionally a more accurate description of the position in the y direction relative to the lines of writing may be given, for example in the form of a value between 0 and 1, as was described above. Also the position in the x direction may, apart from that, be indicated absolutely or relatively with regard to one or two reference points.

The information about an arc may further include information about a curvature radius of the arc. The information about the curvature radius is, however, to be regarded as optional.

Further, the description of a character may include information about a straight line section. For example, the direction of a straight line section may be contained in the information about a character. Thus, the direction of a straight line section may, for example, be given by the indication of an angle with regard to a horizontal and/or with regard to a line of writing 3210, 3212, 3214, 3216. Alternatively or additionally, the location of the identified straight line sections may, for example, be given by the fact that the position of a starting point of the straight line section and of an end point of the straight line section is described. As an alternative to that, information about a straight line section may further include information about a length of the straight line section and about a center point of the straight line section. The mentioned information regarding the straight line section is advantageously selected relative to the lines of writing.

It has thus to be noted that the character description generator 2930 may provide the relative description of a character as the information 2932 using the information provided by the base line detector 2926 and further using the information provided by the Hough transformer 2920, so that the information 2932 describes the position of arcs and/or straight line sections in the character relative to the lines of writing.

FIG. 10c shows an exemplary description of the character "a" illustrated in FIG. 10a. The character "a", according to the description 3280 illustrated in FIG. 10c, includes a first arc which is curved downward, whose extreme 3230 comprises the x coordinate x=0 and which is further located on the center line 3216. The character "a" further includes a second arc which is curved and/or bent to the right, an whose extreme comprises the x coordinate x=−0.5. The extreme 3232 of the second arc is, moreover, located in the second interval (interval II). A y position of the extreme 3232 may, for example, be indicated accurately as y=0.5, whereby it is expressed that the extreme 3232 is located in the middle between the base line and the center line. The character "a" additionally includes a third arc which is curved upward and whose extreme comprises the x coordinate x=−0.1. The extreme 3234 of the third arc is located on the base line 3212, moreover. The right straight line section of character "a", according to the description 3280, goes to the top right and comprises an angle of 80° with regard to a horizontal and/or with regard to a line of writing. A starting point of the straight line section comprises an x coordinate of x=0.4 and is located in the second interval, i.e. between the base line and the center line. An end point of the straight line section comprises an x coordinate of 0.5 and is, for example, located on the center line 3214. The corresponding location information may, for example, be provided by the character description generator 2930 to the database comparator 2940 in an encoded and ordered, or sequenced, manner.

In the following it is described with reference to FIGS. 11 and 12 how, by the character description generator (i.e., for example, by the character description generator 2830 or by the character description generator 2930), information 2822, 2932 may be gained which is especially suitable for being processed by the database comparator 2840, 2940.

Figure 11:
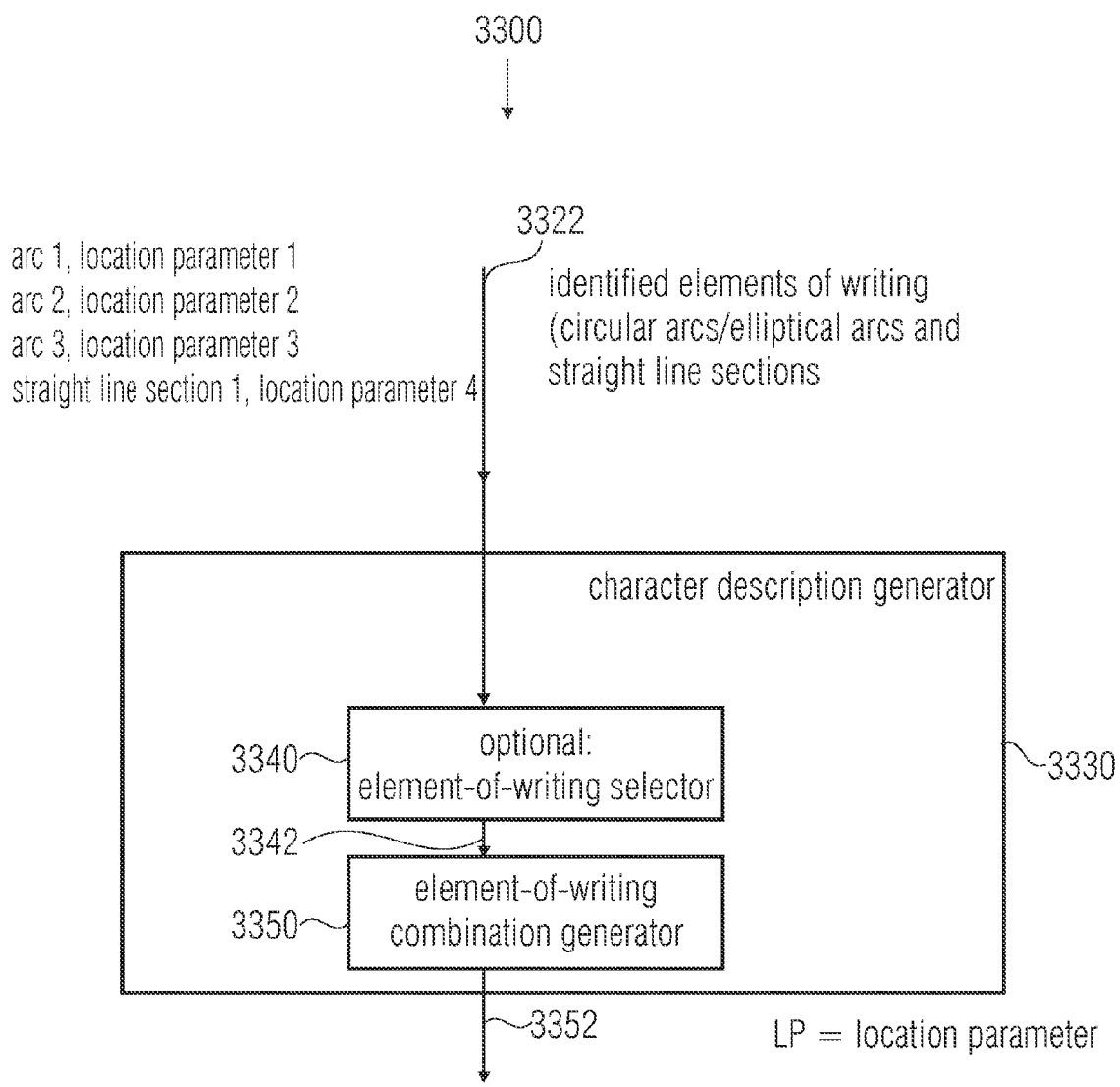
FIG. 11 shows a block diagram of an inventive character description generator in accordance with an embodiment of the present invention.
Figure 11:
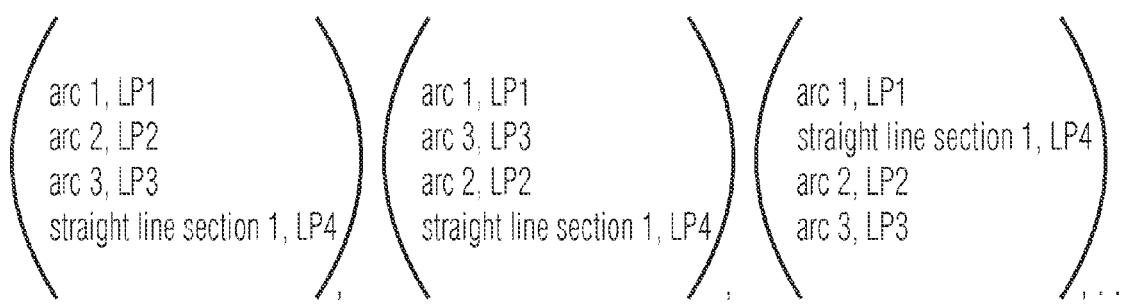

For this purpose, FIG. 11 shows a block diagram of an inventive character description generator according to an embodiment of the present invention. The character description generator according to FIG. 11 is designated by 3300 in its entirety. The character description generator 3300 which, for example, corresponds to the character description generator 2830 according to FIG. 6 or the character description generator 2930 according to FIG. 7 is implemented to receive information 3322 about identified elements of writing, i.e., for example, about identified arcs of a circle or about identified arcs of an ellipse or about identified straight line sections. The information 3322 may here, for example, correspond to the information 2822 or the information 2922. However, in an alternative embodiment, the information 3322 may also be formed based on the information 2928 about lines of writing and based on the information 2922 about the identified elements of writing, and thus describe the position of the identified elements of writing relative to the lines of writing. According to one embodiment of the present invention it is here only of importance that the information 3322 describes different element of writing in one (certain, determined by the preceding processing) order by parameters. The character description generator 3330 includes an optional element-of-writing selector 3340 implemented to select a real subset of selected elements of writing from the entirety of elements of writing described by the information 3322. The number of elements of writing to be selected may here, for example, be given externally. Further, the selection may, for example, take place randomly. Alternatively, it may also be predefined that the element-of-writing selector 3340 selects the subset of selected elements of writing such that the subset of the selected elements of writing describes, for example, a first predefined number of arcs and further a second predefined number of straight line sections. The selection may thus take place randomly or according to a predefined rule.

An element-of-writing combination generator 3350 is implemented to receive a description of the subset 3342 of characters selected by the element-of-writing selector 3340. As an alternative, the element-of-writing combination generator 3350 may also be implemented, for example, to receive the information 3322 when the element-of-writing selector, for example, is omitted.

The element-of-writing combination generator 3350 is implemented to generate different combinations of elements of writing described by the information 3342 or the information 3322, respectively, and output the same as information 3352. The information 3352 here, for example, corresponds to the character description 2832 or the character description 2932 and is, for example, supplied to the database comparator 2840, 2950.

Different combinations of elements of writing here are a different arrangement of the elements of writing. If, for example, the information 3322 describes three arcs and one straight line section with associated location parameters, then the element-of-writing combination generator 3350 may, for example, generate different combinations. A first combination, for example, describes the elements of writing in the order arc 1, arc 2, arc 3, straight line section 1. A second combination, for example, describes the elements of writing described by the information 3322 in the order which is different to the one above: arc 1, arc 3, arc 2, straight line section 1. A third combination generated by the character combination generator 3350 describes, for example, the elements of writing described by the information 3122 in a further order and/or arrangement: arc 1, straight line section 1, arc 2, arc 3.

In other words, the element-of-writing combination generator 3350 is implemented to form sets of differently ordered elements of writing based on the information 3322 in which the elements of writing are arranged in a different order. In what order the elements of writing are arranged may, for example, be determined by rules contained in the element-of-writing combination generator 3350. Alternatively, the element-of-writing combination generator 3350 may also be implemented to use any possible orders.

Thus, the element-of-writing combination generator 3350 is all in all implemented to form several differently ordered sets of elements of writing described by associated parameters based on one single set of elements of writing. Thus, the database comparison executed subsequently by the database comparator 2840, 2940 is independent of the order in which the individual elements of writing are described in the information 3322. Accordingly, the identification of a character is independent of the sequence of the description of the elements of writing in the information 3322, which is how an especially reliable writing detection is achieved.

Figure 12:
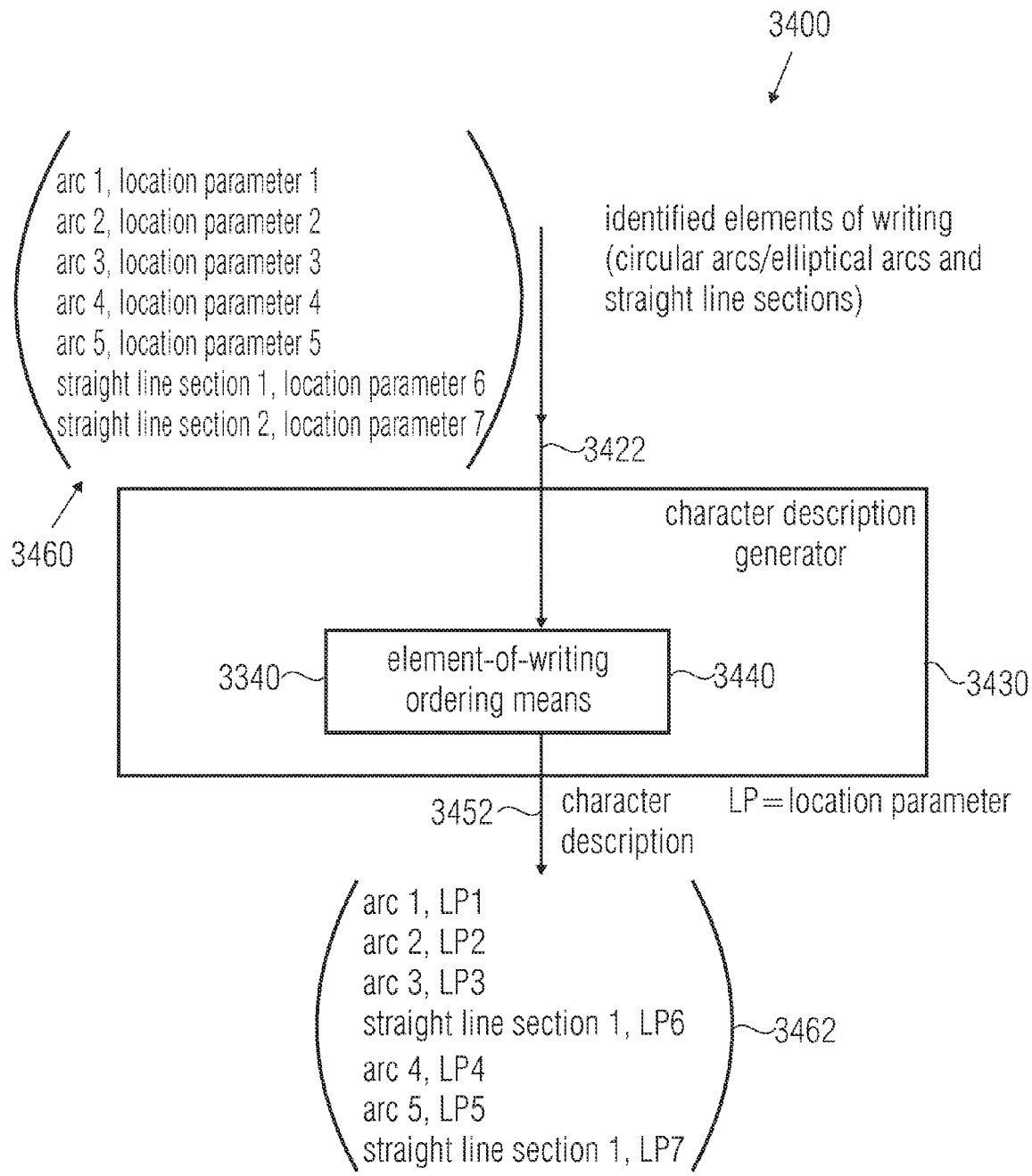
FIG. 12 shows a block diagram of an inventive character description generator in accordance with an embodiment of the present invention.

FIG. 12 shows a block diagram of an inventive character description generator according to an embodiment of the present invention. The character description generator according to FIG. 12 is designated by 3400 in its entirety. In this respect, it is to be noted that the character description generator 3400 receives information 3422 about identified elements of writing which basically corresponds to the information 3322. In the embodiment illustrated in FIG. 12, the information 3422 includes information about, for example, five arcs and two straight line sections to which respective location parameters are associated. One example of the information 3422 is described in more detail in the following with reference to FIG. 13.

The character description generator 3430, which may, for example, take over the position of the character description generator 2830 or the position of the character description generator 2930 or which may alternatively also be a part of the character description generator 2830, 2930, includes an element-of-writing ordering means 3440. The element-of-writing ordering means 3440 is implemented, for example, to generate information 3452 based on the information 3422, in which the elements of writing are ordered such that they describe a continuous base line in the order reproduced by the information 3452. In other words, the element-of-writing ordering means 3440 is implemented to identify a subsequent element of writing for a certain element of writing so that the certain element of writing and the subsequent element of writing form a continuous line of writing. Thus, the element-of-writing ordering means 3440 may be implemented, for example, to identify a distance between end points of several elements of writing and to detect two elements of writing as being subsequent elements of writing, while a distance between an end point of a first element of writing and a starting point of a second element of writing is smaller than a predefined bound. Thus, the element-of-writing ordering means 3440 all in all provides ordered information 3452 which may, for example, serve as input information for the database comparator 2840, 2940.

Figure 13:
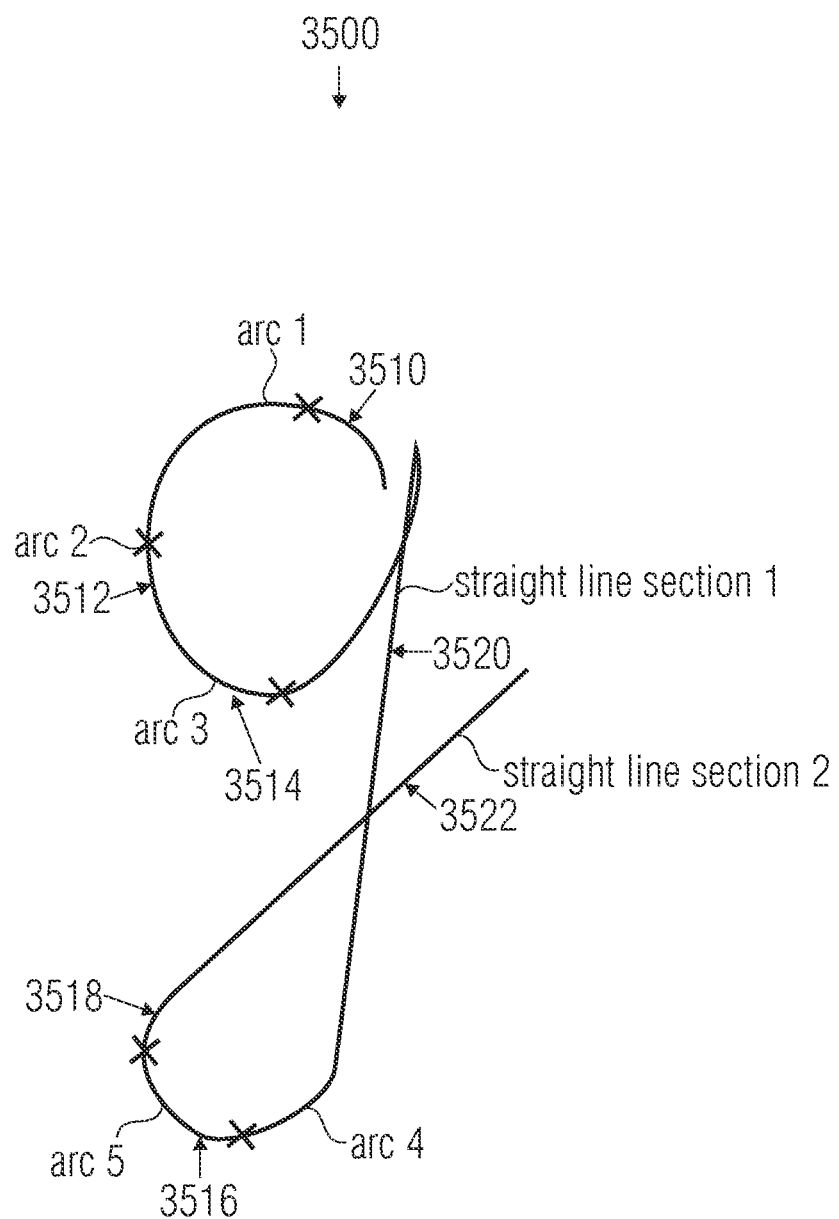
FIG. 13 shows a graphical representation of a character "g"

In the following, with reference to FIG. 13, a concrete example is illustrated, using which the functioning of the element-of-writing ordering means 2440 is better understandable. FIG. 13 shows a graphical representation of a character "g" and of the elements of writing of which the character "g" consists. The graphical representation according to FIG. 13 is designated by 3500 in its entirety. The graphical representation 3500 shows the character "g". The character "g" includes a first arc 3510, a second arc 3512, a third arc 3514, a fourth arc 3516 and a fifth arc 3518. The character "g" further includes a first straight line section 3520 and a second straight line section 3522. It may further be seen that, when writing the character "g", the individual elements of writing are passed in the following order: arc 1, arc 2, arc 3, straight line section 1, arc 4, arc 5, straight line section 2. Thus, for example an end point of the "arc 1" element of writing is adjacent to a starting point of the "arc 2" element of writing. Further, an end point of the "arc 2" element of writing is adjacent to one starting point of the "arc 3" element of writing. Corresponding relationships also hold true for the starting points and end points of the remaining elements of writing. An end point of the "arc 3" element of writing is far away from a starting point of the "arc 4" element of writing, however. Based on the above explained circumstances, for example the element-of-writing ordering means 3410, based on a description describing, for example, first the arcs and only then the straight line sections, by reordering generates a description describing the elements of writing in an ordered order, so that by the corresponding order of the elements of writing a continuous line of writing is described.

An exemplary, non-ordered description is designated by 3460 in FIG. 12, while an illustration ordered according to the course of a line of writing is designated by 3462.

Figure 14:
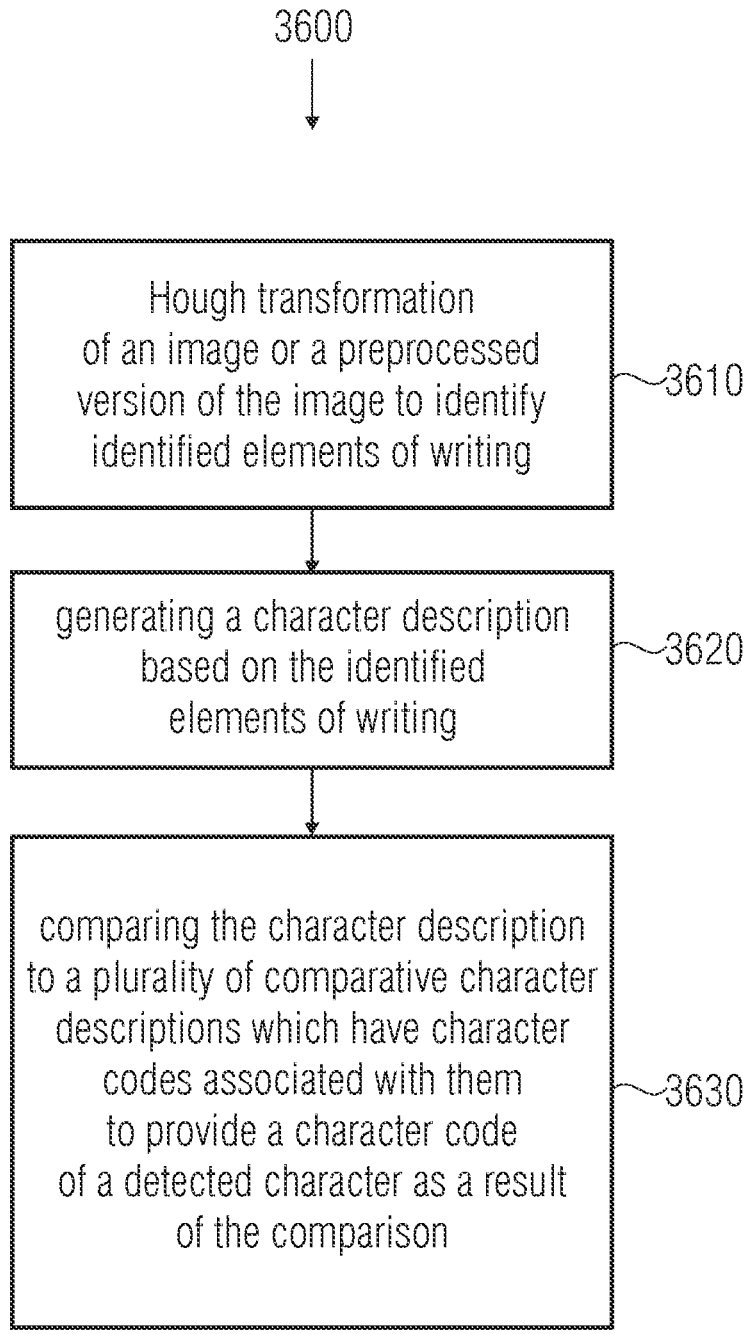
FIG. 14 shows a flow chart of an inventive method of detecting a character in an image.

In the following, an inventive method of detecting a character in an image is described. For this purpose, FIG. 14 shows a flowchart of an inventive method of detecting a character in an image. The method according to FIG. 14 is designated by 3600 in its entirety.

In a step 3610 the method 3600 includes Hough transforming an image or a preprocessed version of the image to identify identified elements of writing. The method 3600 further includes, in a second step 3620, generating a character description based on the identified elements of writing. Further, in a third step 3630, the method 3600 includes comparing the character description to a plurality of comparative character descriptions to which character codes are associated to provide, as a result of comparing, a character code of the detected character.

It is further to be noted that the method 3600 may be supplemented by all those steps which were described with regard to the inventive concept (i.e. with regard to the inventive devices).

The inventive device or the inventive method may be implemented in hardware or in software. The implementation may be executed on a digital storage medium, for example a floppy disc, a CD, a DVD, an ROM, a PROM, an EPROM, an EEPROM or a FLASH memory having electronically readable control signals which may cooperate with a programmable computer system so that the corresponding method is executed. In general, the present invention thus also consists in a computer program product having a program code stored on a machine-readable carrier for executing the inventive method, when the computer program product is executed on a computer. In other words, the invention may also be realized as a computer program having a program code for executing the inventive method, when the computer program is executed on a computer.

In summary, it has to be noted that the present invention describes an especially efficient method of character detection.

In this respect it is to be noted that reading town signs, town names or speed limits is an important aspect of writing detection. Thus, for example many characters and numbers (in some font types even all characters and numbers) are put together from vertical lines, horizontal lines, concave lines and convex lines. At least, however, the characters and numbers in a plurality of font types include vertical lines, horizontal lines, concave lines and convex lines.

For example, a letter "S" has four extremes, just like a letter "O" and/or "o". The letter "S" is, however, different from the letter "O" with regard to a curvature and to a relative distance of the extremes with regard to each other.

Based on the mentioned finding, thus a character detection system may be developed. For the detection of diagonal lines in the letters "W", "Z", "A", "K", "Y", "X", "V", "N" and/or "M", advantageously a Hubel-Wiesel bar detector may be used, as is, for example, described in the publication "A neural net for 2D-slope and sinusoidal shape detection" by A. Brückmann, F. Klevenz and A. Wünsche (published in: International Scientific Journal of Computing, Vol. 3, Edition 1, Ukraine, 2004, pp. 21-25). Both the detection of arcs (for example of arcs of a circle or of an ellipse) and also the detection of straight line sections (e.g. of diagonal lines) may in one embodiment of the present invention be based on the same architecture "Dual Hough IP Core", only with a different programming. In other words, a re-configurable Hough transformer may be used which, for example, in a first configuration state is able to detect arcs and which in a second configuration state is able to detect straight lines.

In one embodiment of the present invention, a position of found extremes is associated with a line system, for example like in an exercise book of first-grade students.

Thus, in one embodiment of the present invention, a base line, a center line, for example with lower-case letters "d", "c", and an upper line, for example with upper-case letters "C", "K", are determined.

In one embodiment of the present invention, not only the extremes belong to a character detection, but every extreme comprises information "convex/concave top/bottom", "convex/concave left/right". In other words, in one advantageous embodiment, for example also information about a curvature of arcs is determined and assessed later.

In a software simulation (or generally when executing a Hough transform, respectively) for example a range between a maximum curvature radius and a minimum curvature radius may be set, wherein for example only arcs having a curvature radius between the maximum curvature radius and the minimum curvature radius are detected by the Hough transformer.

Further, in software simulation, or when executing the Hough transform, respectively, with the help of a parameter "DelayLines not sum" it may be determined which delay lines in the Hough transformer and/or in the Hough field do not contribute to a summation. Thus, it may, for example, be finely set that lines around the extreme do not contribute to a summation, as otherwise too often straight lines would be counted and/or determined.

In other words, it may be achieved in the Hough transformer that a section of a line which is located in the proximity of an extreme of the curved line does not contribute to a result of the Hough transform.

Thus, in one embodiment of the present invention, with regard to a curved line in the image (for example with regard to a circularly curved line or an elliptically curved line) a feature vector results having the form (x, y position of the extremes; curvature radius in a range of values of negative max_curvature radius, positive max_curvature radius). In other words, a feature vector with regard to a curve in the image describes the position of an extreme point of the arc as well as a curvature radius, whereas the curvature radius is smaller regarding its absolute value than a maximum curvature radius.

Further, character single segmentation algorithms exist. In this respect, reference is made, for example, to documents of K. H. Noffz and R. Lay at the University Ruprecht Karl of Heidelberg or by T. Roska at the Pázmány P. Catholic University of Budapest.

As an example it is to be noted here that a character "c" includes three extremes, one on the center line, one on the base line and one in between. In this case, a relative x position of the extremes with regard to each other further counts.

In one advantageous embodiment, a classification is executed according to a classical variation method of min $(X-X_i)^2$. Alternatively or additionally, a classification is further performed according to a labeling method by V. Ferrari. For details in this respect, reference is made to the publication "Object detection by contour segment networks" by V. Ferrari et al. (published: European Conference of Computer vision (ECCV), Graz, May 2006).

For a double cross check or at least for checking the character detection, in one embodiment of the present invention the use of a Euler connectivity number is obvious. The Euler connectivity number is defined as follows:

connectivity number=number of the objects–number of enclosed holes.

An object is here defined as a continuous area of image points, or pixels.

The connectivity number is calculated in a pixel grid from the determination of 2×2 search masks according to $$K = n*\begin{bmatrix}1 & 0\\ 0 & 0\end{bmatrix} - m*\begin{bmatrix}? & 1\\ 1 & 0\end{bmatrix}$$

For the different letters of the Latin alphabet, the following applies:
for "B": K=−1;
for "Q", "R", "O", "A": K=0;
for the remaining letters or for the rest: K=1.

Figure 15:
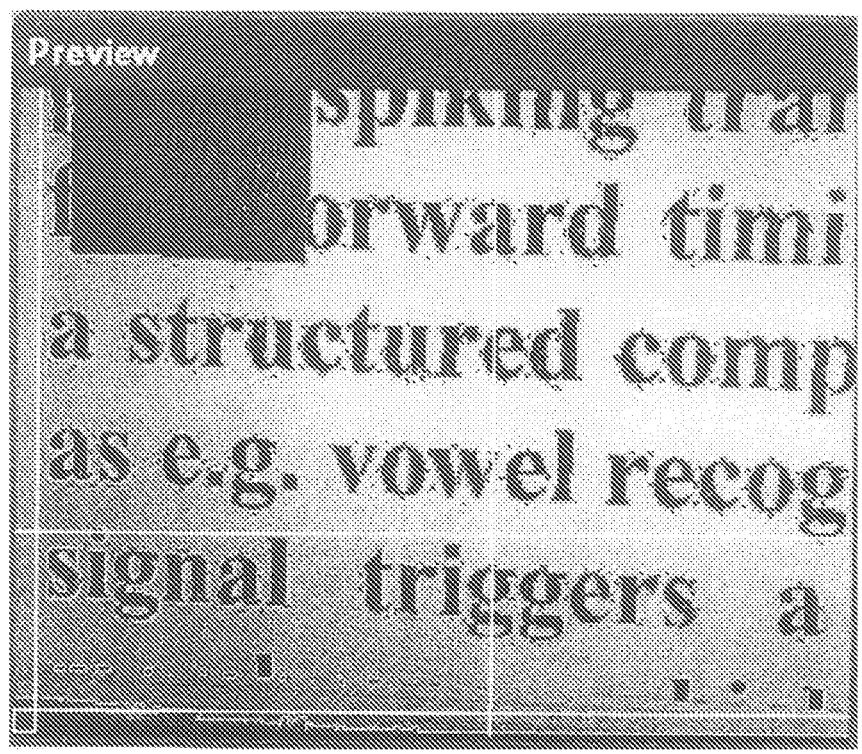
FIG. 15 shows a graphical representation of extreme points detected in an image.

Further, FIG. 15 shows a screen illustration of a hyperfine structure of a writing detection using a WinDelay program.

The graphical representation of FIG. 15 is designated by 3700 in its entirety. From the graphical representation 3700 it may be seen that a comma at the bottom left is marked (for example by the WinDelay program). Further, alternatively or additionally, a letter "G", a letter "S" and/or a letter "O" is marked. Even a letter thickness and serifs may be determined. An input image from which the graphical representation 3700 is gained is a text recorded by a screen with a camera (e.g. using a Web-Cam).

In the following, the method of character detection is again described step by step with reference to an embodiment. In the first steps, the method is similar to an identification of ellipses (also referred to as ellipse finder). Parameters, like for example a threshold, may be set in a program "WinDelayLine", providing the function of a Hough transform.

The character detection is executed step by step as follows:

1) Record an image with a camera. Alternatively, the image may, for example, also be generated by a scanner or gained otherwise.

2) Set threshold value; binarization (ought to be adaptive according to histogram distribution of the gray levels); with video readjust more often after x frames or best, optimum threshold for each image; standard image processing.

3) Find contour; contour finder algorithm is an algorithm set up from morphological operators, in principle an edge detection algorithm.

4) Hough transform; with the help of a Hough transform (for example executed by the software "WinDelayLine"), extremes in an image are found an marked (for example in red). Each extreme is indicated with an x, y position and additionally has a curvature value. The clouds of marked extremes generated by the Hough transform (also referred to as "red clouds") may be more or less dense, depending on the variation of the parameter core size, minimum curvature radius, maximum curvature radius, delay not sum. For details in this respect, reference is made to the dissertation "Echtzeitfähige, auf der Hough-Transformation basierende Methoden der Bildverarbeitung zur Detektion von Ellipsen" by J. Katzmann (dissertation at the University of Ilmenau, Germany, 2005).

5) Classification according to Hamilton's variation calculation according to min (integral) $(X\_i-t\_j)^2$. In other words, for example a deviation between a feature vector and a comparative feature vector is minimized.

The algorithm works, for example, as follows for the detection of an ellipse:

Set up a list of all possible four-point pairs; fit an ellipse for each combination of four, determine the ellipse parameters and form the deviation of the measurement points from the fitted ellipse. Set up a decreasing list of the combinations of four according to the min deviation (or the minimum deviation, respectively).

Step 5) is to be regarded as optional however.

6) Letters and numbers consist of lines and arcs. Here, a law of curve sketching has to be taken to heart: each function may be approximated by a node and a second derivation. This is only true in the digital case with limitations: vertical and horizontal lines are found, also circles are not a problem, but with straight lines of different inclination the method does not work well. Here, for example, in the software WinDelayLine or in the Hough transformer, respectively, a straight line Hough finder is used, as is described, for example, in the publication "A neural net for 2D slope and sinusoidal shape detection" by A. Brückmann, F. Klefenz and A. Wünsche (published in: International Scientific Journal of Computing 3 (1), pages 21-26, 2004).

Thus, a complete computational neuro-scientific Hubel-Wiesel solution of an orientation selectivity is achieved.

7) Form a bunch of templates in a contour description language. For example, a contour description language may be used as is described in the publication "Object detection by contour segment networks" by V. Ferrari et al (published: European conference on computer vision (ECDB), Graz, May 2006).

An exemplary description is given here with reference to character "p": straight downward line; three extremes with a downward curvature, curvature bending to the left, horn growth bending upward.

Form all four-point combination pairs from a straight element and three arc elements under the compulsory condition that a default for a position (e.g. position below a center line or above a center line) is to be maintained in tolerance ranges and that the "p" line has to be located left of the three arcs of a circle. For all letters and numbers (at least for a plurality of letters or numbers), their characteristic template is to be generated and all combination pairs are to be matched with the template. A minimum is the result.

In other words, four points are determined representing extremes of arcs or characteristic points of straight line sections (e.g. starting points, center points or end points), wherein certain default position relations are to be maintained (e.g. points above or below a center line, or relation of the existing curvatures).

Further, alternatively or additionally, a method may be applied, as it is described in the publication "object detection by contour segment networks" by V. Ferrari et al. The corresponding method may be summarized as follows: If an object is put together from lines and arcs of a circle, describe, how the object is put together. The description may for example be as follows: corner; line upward, y centimeters; line downwards, x centimeters; curvature arc with curvature radius r. This template is thereupon shifted in different directions ("crisscross") across marked points (extremes identified in the image; also referred to as "red points"). Form "Min (templates vector—red point vector)". In other words, determine a deviation between a template vector and a vector describing features or describing a position of the identified extremes, respectively ("red points vector"). Where there is a best possible match it is assumed that an object is present.

In the following it is still to be explained how a Euler connectivity number may be determined. In this respect, it is noted that Leonard Euler, which used to be on a 10 franks bill was the first to determine the connectivity number. His scripts are in Latin and his formula is:

The connectivity number K is equal to a number of objects minus a number of holes.

In a translation of this fact that may be used for an application in a computer system in a pixel grid, this means:

an object is defined as a continuous area of pixels (also referred to as pixel area). For example, an object may be defined as a continuous pixel area of black pixels. The continuous area of pixels (pixel area) may also contain holes and/or enclosures, for example in the form of white pixels. A hole is here defined as an enclosure in a border of black pixels. In other words, a hole is for example a pixel of a first color (a white pixel) which is surrounded by pixels of another color (e.g. of black pixels).

In the following it is described how the connectivity number may be determined based on local 2×2 operators. For this purpose it is counted how often a 2×2 pattern $$\begin{pmatrix} 1 & 0 \\ 0 & 0 \end{pmatrix}$$

is present in a pixel image.

It is further counted, how often a 2×2 pattern $$\begin{pmatrix} ? & 1 \\ 1 & 0 \end{pmatrix}$$

is present in the image.

Then, the determined numbers are subtracted from each other and this number (for example the result) indicates the connectivity number.

Applied to letters this means, that capital "B" has the connectivity number K=−1, that the letters "a", "b", "d", "e", "q", "o", "p" and "R" comprise the connectivity number K=0, and that the remaining letters (for example of the Latin alphabet) comprise the connectivity number 1.

Alternatively, it may be determined, that in another font illustration, the letters "A", "D", "O", "P", "Q", "a", "b", "d", "e", "g", "o", "p" and "q" have the connectivity number 0.

The Euler connectivity number may thus serve as a double crosscheck as to whether or not a correct letter was found.

In summary, it may thus be said that the present invention provides an especially advantageous concept for character detection.

An inventive device for identifying a traffic sign in an image according to an embodiment of the present invention will be described below. It is to be noted that the device is implemented to receive an image. Further, the device includes an optional edge detector. Also, the device includes a Hough transformer. The edge detector and the Hough transformer correspond to the means described with reference to FIG. 10 with regard to their functioning.

The device further includes at least one shape detector or one ellipse detector, advantageously however both a shape detector and also an ellipse detector. With regard to its function, the shape detector corresponds to the shape detector described herein, and the ellipse detector, with regard to its function, corresponds to the ellipse detector described herein.

In addition, the device includes a pattern identifier. The pattern identifier or pattern detector, respectively, is implemented to receive information about arcs of a circle or arcs of an ellipse in the image from the Hough transformer or to receive information about straight line sections running through the image from the Hough transformer. Thus, the Hough transformer may for example be implemented in the device to only provide information about arcs of a circle or arcs of an ellipse in the image, or to only provide information about straight line sections in the image. Alternatively, the Hough transformer may also be able to provide information both about arcs of a circle or arcs of an ellipse in the image and also about straight line sections in the image. A decision, what information the Hough transformer provides, among others depends on the fact what information is required by the shape detector and/or the ellipse detector as well as by the pattern identifier.

The pattern identifier includes an image section selector implemented to select an image section of the image using the information provided by the shape detector about a (general) shape detected in the image and/or based on the information provided by the ellipse detector about an elliptical shape detected in the image. The selection of an image section may for example be executed as it was described with reference to FIG. 15.

Further, the image section selector may optionally be implemented to execute a mapping of the image section, as it was described with reference to FIG. 15. Further, the image section selector may alternatively be implemented to determine the image section using a masking. The pattern identifier further includes a writing detector implemented to receive the image section or information about the image section selected by the image section selector. Further, the writing detector is implemented to receive the information about arcs of a circle and/or arcs of an ellipse and/or straight line sections in the image provided by the Hough transformer. Further, the writing detector is implemented to determine those arcs of a circle and/or arcs of an ellipse and/or straight line sections lying in the image section selected by the image section selector. Thus, the writing detector receives information about selected arcs of a circle and/or arcs of an ellipse and/or straight line sections in the image lying in the image section.

The information about selected arcs of a circle and/or straight line sections received by the writing detector thus describes elements of writing. Thus, a writing detection may be executed as it was explained with reference to FIGS. 6-14.

It is further to be noted that the pattern identifier may also be set up differently. It is here only decisive that the writing detector all in all contains information about selected arcs of a circle and/or arcs of an ellipse and/or straight line sections in the image, lying within a general (e.g. triangular or rectangular or square) or elliptic form detected by the shape detector or by the ellipse detector. The information about the selected arcs of a circle and/or arcs of an ellipse and/or straight line sections in the image thus takes on the place of the information about identified elements of writing (see FIG. 6). If the writing detector detects a character, then the writing detector for example provides a character code of a detected character, as it was for example described with reference to FIG. 6. The character code provided by the writing detector may for example carry information about the fact which traffic sign was detected. In other words, the detected character code may be part of information describing an identified traffic sign. If the traffic sign includes more than one letter and/or more than one character, the writing detector may optionally also provide information about a font in a traffic sign which includes more than one letter. The corresponding font may then, for example by a comparison to a database, be used to identify the information represented by the traffic sign and/or the traffic sign itself.

In summary it may thus be noted that the writing detector is implemented to provide a character code of at least one detected character based on information about elements of writing lying within a shape detected by the shape detector or the ellipse detector, wherein the character code is advantageously used to determine information about an identified traffic sign.

It may thus be noted that the information provided by the Hough transformer may be reused repeatedly in the detection of a traffic sign. The information about arcs of a circle and/or arcs of an ellipse and/or straight line sections identified in the image may on the on hand be used to detect general or elliptical shapes in the image with the help of a shape detector or with the help of an ellipse detector. Further, the information provided by the Hough transformer may subsequently be used to identify one or several characters in an image section described by the detected shapes, to thus obtain especially reliable information about an identified traffic sign.

In one embodiment, the present invention thus provides an especially advantageous concept for traffic sign detection based on the execution of the Hough transform, wherein the information provided by the Hough transformer may even be reused repeatedly depending on the embodiment.

A means for performing a parallel Hough transform or for determining extreme points of bent lines will be described below. Detection of various straight line sections while using a parallel Hough transform is described, incidentally, in the publication "A neural net for 2D-slope and sinusoidal shape detection" by A. Brückmann, F. Klevenz and A. Wünsche (published in: International Scientific Journal of Computing, Vol. 3, $1^{st}$ ed., Ukraine, 2004, pp. 21-25).

Figure 1:
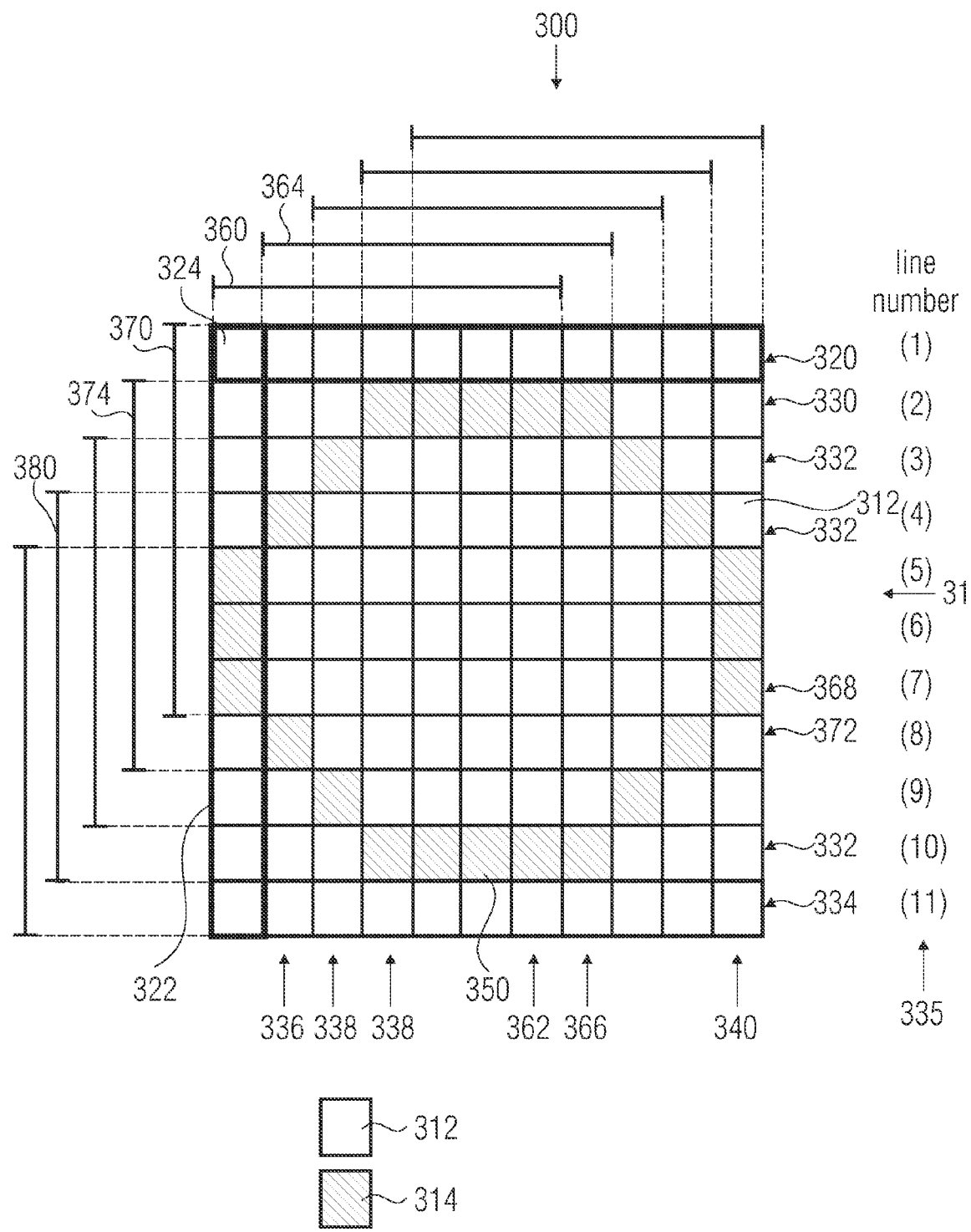
FIG. 1 shows a graphical representation of an exemplary raster image and of image sections processed successively.

FIG. 1 shows a graphical representation of an exemplary raster image of an ellipse. The graphical representation of FIG. 1 is designated by 300 in its entirety. What is shown in this context is a raster image 310 having a plurality of raster points 312. A raster point may be inactive or white, as is shown for the raster point 312. A raster point may further be active or black, as is indicated, for example, for the raster point 314 by means of hatching. It shall further be noted that the raster image 310 comprises a plurality of raster lines and a plurality of raster columns. A raster line in this context summarizes a plurality of raster points, as is illustrated, for example, by the area 320, which has thick borders and describes a raster line. A raster column also defines a combination of several raster points. One example of a raster column is shown by the thick-border area 322, which represents a raster column. Raster lines and raster columns are advantageously orthogonal to one another. In addition, it shall be noted that raster lines and raster columns may overlap, of course. For example, the raster line 320 and the raster column 322 have a common image point designated by 324. It shall also be noted that an image or image section may be fully described both by a plurality of raster lines and by a plurality of raster columns, since obviously each rastered area may be described both by raster lines and by raster columns. It shall also be noted that by definition, the raster image 310 comprises a first raster line, the raster line 320, a second raster line 330, several further raster lines 332, which advantageously are numbered consecutively, and a last raster line 334. Corresponding line numbers are designated by 335. Similarly, the raster image 310 comprises a first raster column 322, a second raster column 336, further raster columns 338, which advantageously are numbered consecutively, and a last raster column 340.

The graphical representation 300 further shows an ellipse 350 represented by the raster image 310 in the form of active or black raster points (or image points), the active raster points being marked by hatching.

The graphical representation 300 further shows a first group of raster columns which is designated by 360. The first group of raster columns comprises the first raster column 322, the second raster column 336 and all of the following raster columns up until the seventh raster column 362, inclusively. The first group 360 of raster columns thus describes a section of the raster image 310.

The above-mentioned section of the raster image further comprises a plurality of raster lines, which are reduced in length as compared to the original raster lines due to the restriction in the number of columns. The shortened raster lines, which may arise on account of the selection of an image section, will also be referred to as raster lines for short in the following.

The second group of raster columns, which is designated by 364, further comprises the second raster column 336 and the following raster columns up to an eighth raster column 366. In other words, seven adjacent raster columns are combined into one group of raster columns, respectively, which are provided for shared processing.

Similar grouping may be performed for the raster lines, for example the first raster line 320, the second raster line 330 and all of the following raster lines up to the seventh raster line 368 being combined into a first group 370 of raster lines. Similarly, a second group of raster lines comprises the second raster line 330 up to the eighth raster line 372, the second group of raster lines being designated by 374.

In this context it shall naturally be noted that a group of raster lines may comprise any number of raster lines, for example five raster lines, 16 raster lines, 32 raster lines, or 64 raster lines. In this context it is only advantageous for the number of raster lines combined into a group of raster lines to be larger than 2. Analogous considerations shall also apply to a group of raster columns.

Figure 2A:
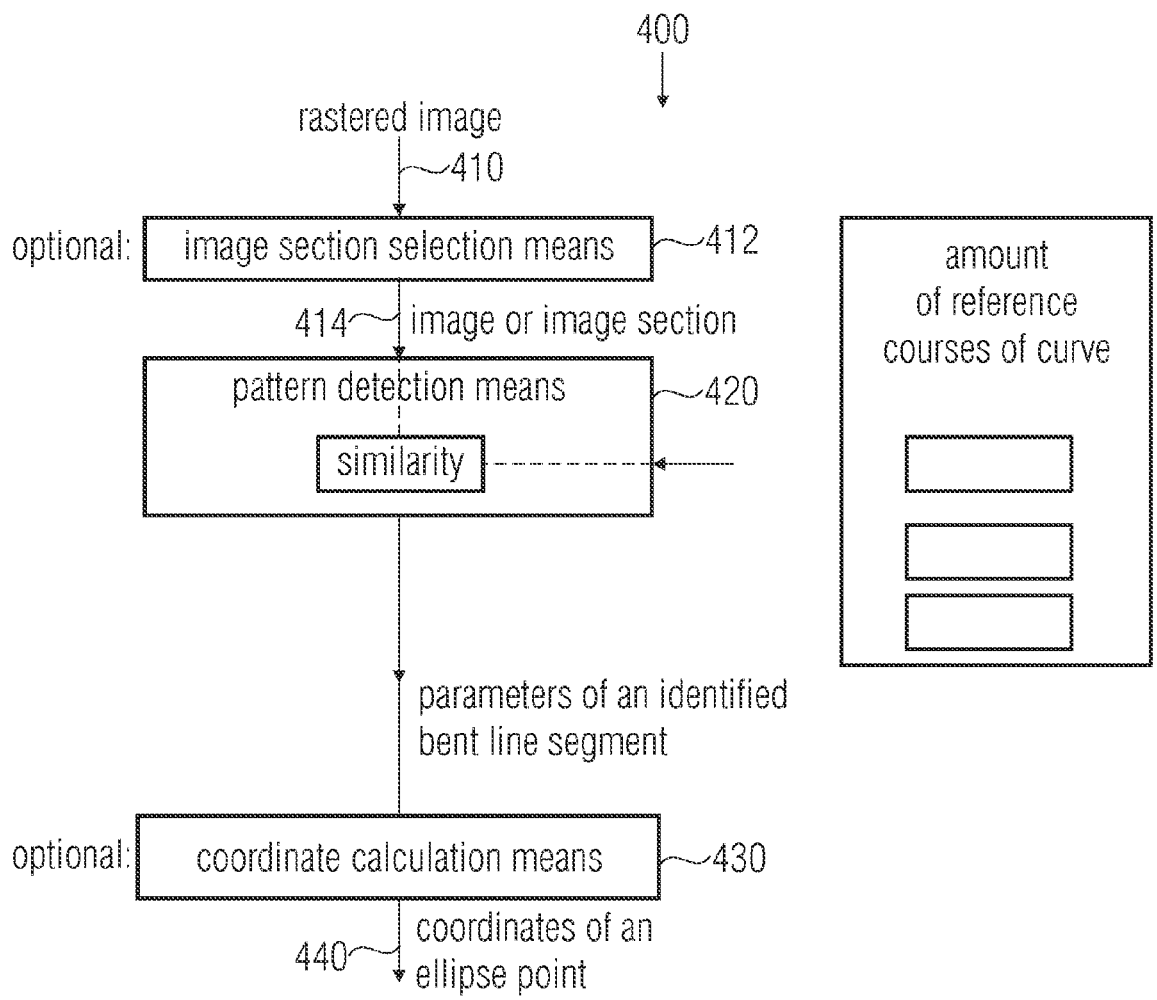
FIG. 2a shows a block diagram of an inventive device for determining coordinates of an ellipse point in accordance with a second embodiment of the present invention.

FIG. 2a shows a block diagram of an inventive device for determining coordinates of an ellipse point (e.g. of an extreme point of an elliptical arc segment or of a circular arc segment) in a graphic image in accordance with a second embodiment of the present invention. The device of FIG. 2a is designated by 400 in its entirety. The device 400 is particularly well suited to process a raster image 310 as is depicted in FIG. 1, as will be explained below.

The device 400 is implemented to receive a rastered image 410. In addition, the device 400 is optionally implemented to select an image section 414 from the rastered image 410 while using an optional image-section selection means 412. A selected image section 414 may be defined, for example, by a plurality of raster lines and/or a plurality of raster columns, for example by a group of raster lines or a group of raster columns, as was described with reference to FIG. 1. The inventive device 400 further comprises a pattern detection means 420 implemented to receive the rastered image or the rastered image section 414. In addition, the pattern detection means 420 is implemented to establish whether a course of curve or a bent line segment among a set of reference courses of curve is contained in the rastered image or image section 414.

The courses of curve of the set of reference courses of curve here may be stored within a memory, for example, for determining the similarity between courses of curve contained in the rastered image or image section 414 and the reference courses of curve. However, it is possible for the structure of the pattern detection means to be implemented to detect whether a course of curve which is sufficiently similar to a reference course of curve among the set of reference courses of curve is contained in the rastered image or image section 414. As reference courses of curve, use is advantageously made of such courses of curve which approximate an ellipse at the first ellipse point, at the second ellipse point, at the third ellipse point, or at the fourth ellipse point. Consequently, the pattern detection means is generally implemented to detect whether a course of curve which detects an ellipse at the first ellipse point, at the second ellipse point, at the third ellipse point, or at the fourth ellipse point is contained in the rastered image or image section 414.

The pattern detection means 420 is further advantageously implemented to identify, among the set of reference courses of curve, a course of curve which is sufficiently similar to a course of curve contained in the rastered image or image section 414, as the first bent line segment, the second bent line segment, the third bent line segment, or the fourth bent line segment, depending on which one among the first ellipse point, the second ellipse point, the third ellipse point, and the fourth ellipse point is the point where the reference course of curve among the set of reference courses of curve approximates the ellipse.

In addition, the pattern detection means 420 is implemented to determine at least one location parameter—but advantageously two location parameters and, optionally, a further parameter which describes a course of curve—of the first line segment, of the second line segment, of the third line segment, or of the fourth line segment. An optional coordinate calculation means 430 may then calculate the coordinates of the first ellipse point, of the second ellipse point, and of the third ellipse point or of the fourth ellipse point from the location of the identified first bent line segment, of the second bent line segment, of the third bent line segment, or of the fourth bent line segment. However, the coordinate calculation means 430 may also be omitted if, for example, the location parameters of the bent line segments which are determined by the pattern detection means 420 are already defined such that the location parameters directly indicate coordinates of the first ellipse point, of the second ellipse point, and of the third ellipse point or of the fourth ellipse point, at which the bent line segments advantageously extend through the specific ellipse points.

It shall further be noted that as reference courses of curve, use is advantageously made of such courses of curve which approximate an ellipse at the first ellipse point, at the second ellipse point, at the third ellipse point, or at the fourth ellipse point (or in surroundings of the respective ellipse points). As reference courses of curve, use is advantageously made of symmetrical bent courses of curve. Also, it is advantageous to use, as reference courses of curve, for example sections from circular curves, since circular curves approximate an ellipse particularly well at the first ellipse point, at the second ellipse point, at the third ellipse point, or at the fourth ellipse point.

Figure 2B:
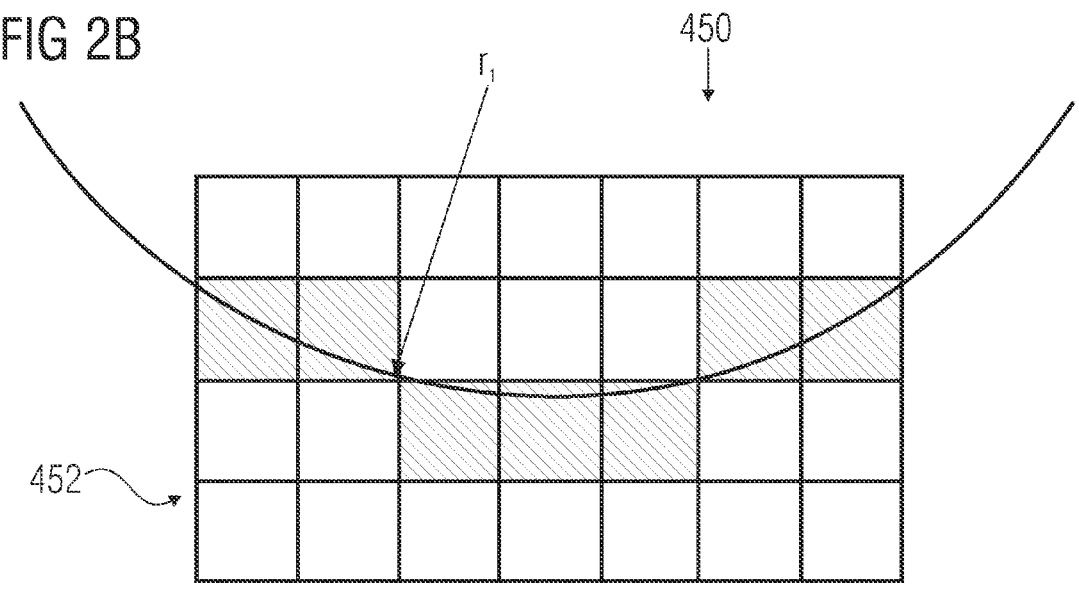
FIG. 2b shows a graphical representation of three exemplary reference curves for utilization in an inventive pattern detection means.
Figure 2B:
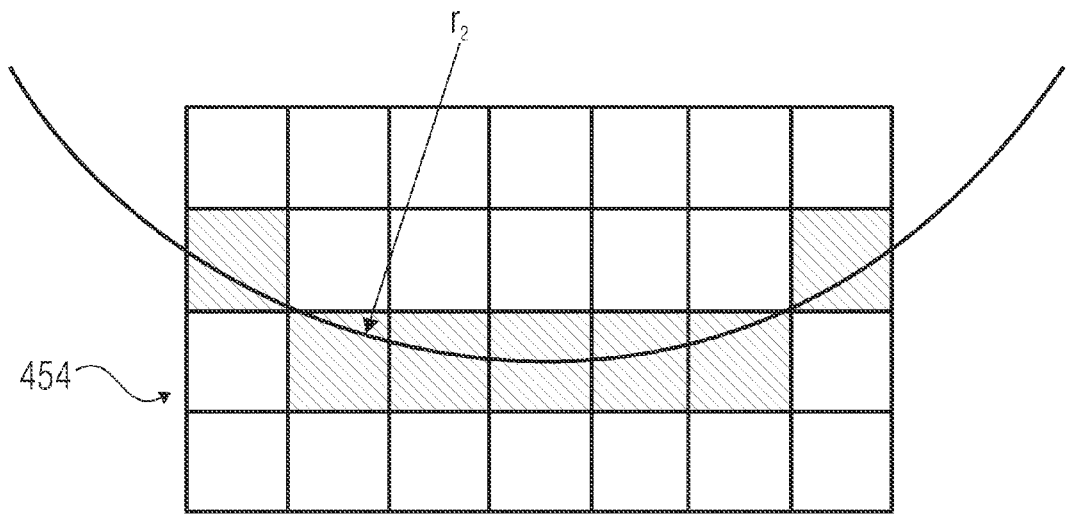
Figure 2B:
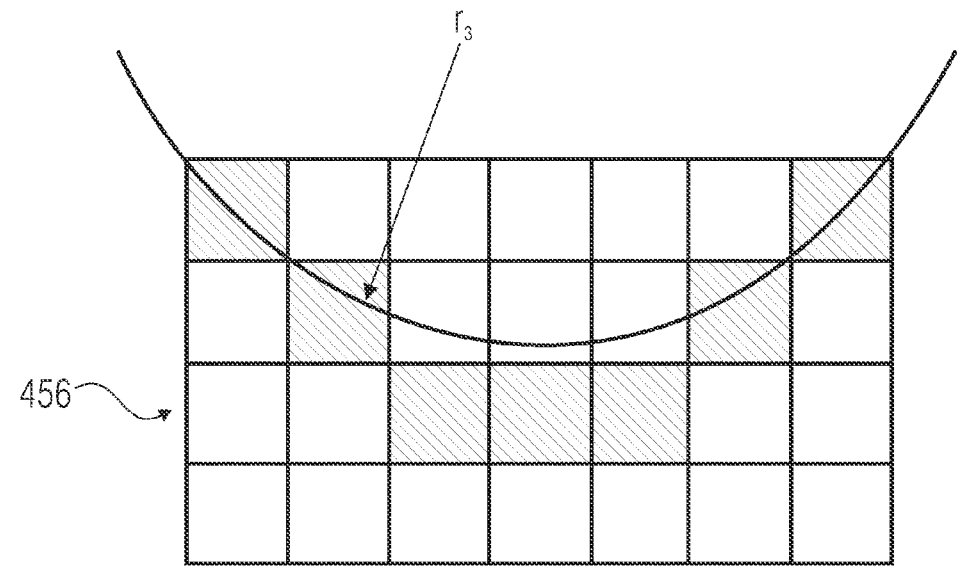

FIG. 2b is a graphical representation of two examples of reference courses of curve for utilization in an inventive pattern detection means. The graphical representation of FIG. 2b is designated by 450 in its entirety. A first graphical representation 452 describes, in the form of a raster image, a first reference course of curve which approximates a section from a circular curve with a first curvature radius $r_1$. A second graphical representation 454 describes, in the form of a raster image, a second reference course of curve which approximates a section from a circular line with a second curvature radius $r_2$, the second curvature radius $r_2$ being larger than the first curvature radius $r_1$. In addition, a third graphical representation 456 depicts, in the form of a raster image, a third reference course of curve, which also describes a section from a circular line having a third curvature radius $r_3$. In this context, the third curvature radius $r_3$ is smaller than the first curvature radius $r_1$. The three graphical representations 452, 454, 456 of FIG. 2b therefore describe three potential reference courses of curve for utilization in the pattern detection means 420. In other words, the pattern detection means 420 may generally be implemented to detect, in the rastered image or image section 414, the three reference courses of curve depicted in the graphical representations 452, 454, 456 of FIG. 2b, and to identify them, for example, as a first bent line segment which approximates the ellipse, which is to be identified, at the first ellipse point. Moreover, the pattern detection means 420 is advantageously implemented to describe, by means of location parameters, the location of a reference course of curve detected in the rastered image or image section 414, and to make said location parameters available to the coordinate calculation means 430, unless the above-mentioned location parameters directly represent the coordinates of a first ellipse point at which the known reference course of curve approximates the ellipse to be identified.

Figure 3A:
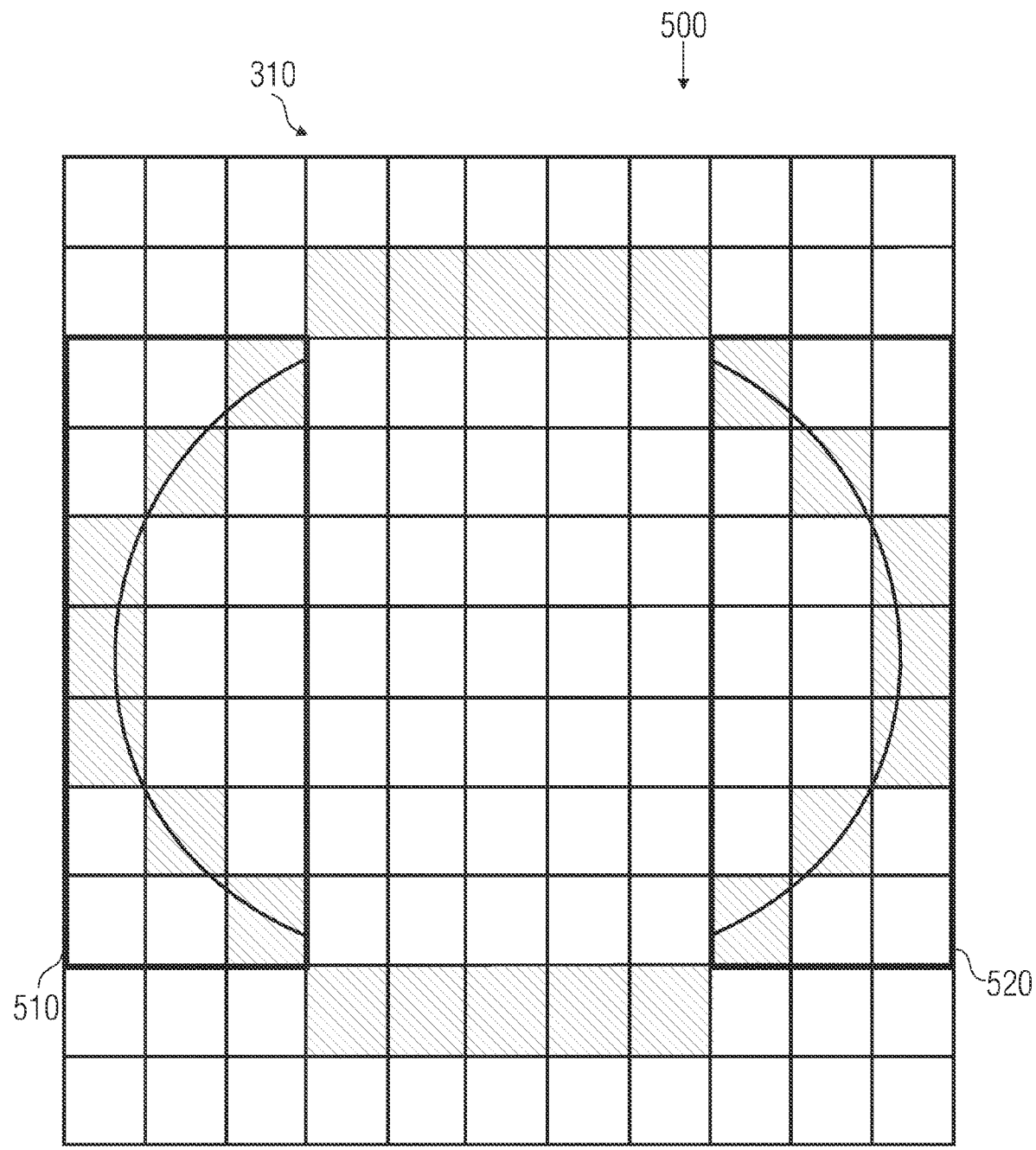
FIG. 3a shows a first graphical representation of an exemplary raster image having detected bent line segments marked therein.

FIG. 3a shows a first graphical representation of an exemplary raster image comprising detected bent line segments marked therein. In this context, it is assumed that the pattern detection means 420 of the device 400 of FIG. 2a is able, for example, to detect, in an image or image section, the reference courses of curve depicted in the first graphical representation 452, in the second graphical representation 454, and in the third graphical representation 456. It is also assumed that the exemplary raster image 310 of FIG. 1a is supplied to the pattern detection means 420 as a rastered image 414. By way of example, it is also assumed that the raster image 310 of the pattern detection means is supplied either on a line-by-line or column-by-column basis. Assuming that the raster image 310 of the pattern detection means 420 is supplied on a column-by-column basis, starting with the first raster column 322, the pattern detection means 420 may detect, in the rastered image, e.g. the third reference course of curve of the graphical representation 456. In the graphical representation 500 of FIG. 3a, the course of curve which is detected in the process is marked by 510. However, if the raster image 310 of the pattern detection means 420 is supplied on a column-by-column basis, starting with the last raster column 340, the pattern detection means may detect, for example, a further course of curve which is designated by 520 in the graphical representation 500.

It shall also be noted in this context that the pattern detection means 420 may only have an image section supplied to it which is selected by the image-section selection means 412. For example, in a first processing step, the pattern detection means 420 may only have a limited image section supplied to it which comprises the first group 370 of raster lines. In other words, an image section comprising the first raster cell 320 and the adjacent raster lines up to the seventh raster line 368 may be supplied to the pattern detection means 420 in the first processing step. For example, this image section comprises does not comprise a course of curve which would match any of the reference courses of curve shown in the graphical representations 452, 454 and 456. Subsequently, in the second processing step, the pattern detection means 420 may have an image section supplied to it which comprises the second group 374 of raster lines. In other words, the pattern detection means 420 has the image contents between the second raster line 330 and the eighth raster line 372, inclusively, supplied to it on a column-by-column basis (that is, one column after another), for example. This image section, too, does not comprise a course of curve which would match the three reference courses of curve of the graphical representations 452, 454, 456. In a third processing step, the image content may further be supplied to a third group of raster lines of the pattern detection means 420. The third group of raster lines here is designated by 380 and comprises the raster lines 3 to 9. The pattern detection means 420 may identify, within this image section, a course of curve which corresponds to the third reference course of curve of the graphical representation 456. The identified course of curve is therefore designated by 510 in the graphical representation 500. It shall further be noted that in order to improve the resolution, adjacent groups 370, 374, 380 of raster lines overlap, that is comprise common raster lines. In this context, it is advantageous for adjacent groups of raster lines to differ by only one single raster line, i.e. for adjacent groups of raster lines to be mutually offset by exactly one raster line, as is shown in FIG. 1, for example.

In other words, the device 400 may be implemented to successively process various image sections which comprise various groups of raster lines, and to subject them to pattern detection. Thus, pattern detection means may only process a small image section in each case, which intensely reduces the complexity of pattern detection. In addition, the number of reference courses of curve used may be kept small as a result. It shall further be noted that information about a location of the bent line segment which approximates an ellipse at the first ellipse point, at the second ellipse point, at the third ellipse point, or at the fourth ellipse point may be derived from the information indicating the image section in which the reference course of curve may be identified, i.e. indicating the group 370, 374, 380 of raster lines which is used for identifying the reference course of curve. In other words, the information stating the image section in which the reference course of curve is identified represents a location parameter of the bent line segment and may thus be used for determining at least one coordinate of the first ellipse point, of the second ellipse point, of the third ellipse point, or of the fourth ellipse point.

Similarly, the first image 310 may also be supplied to the pattern detection means 420 on a line-by-line basis, that is one line after another. In this context, several image sections, which comprise different groups 360, 364 of raster columns, may be processed one after another. The explanations given with regard to column-by-column processing of a group of raster lines shall apply analogously.

Figure 3B:
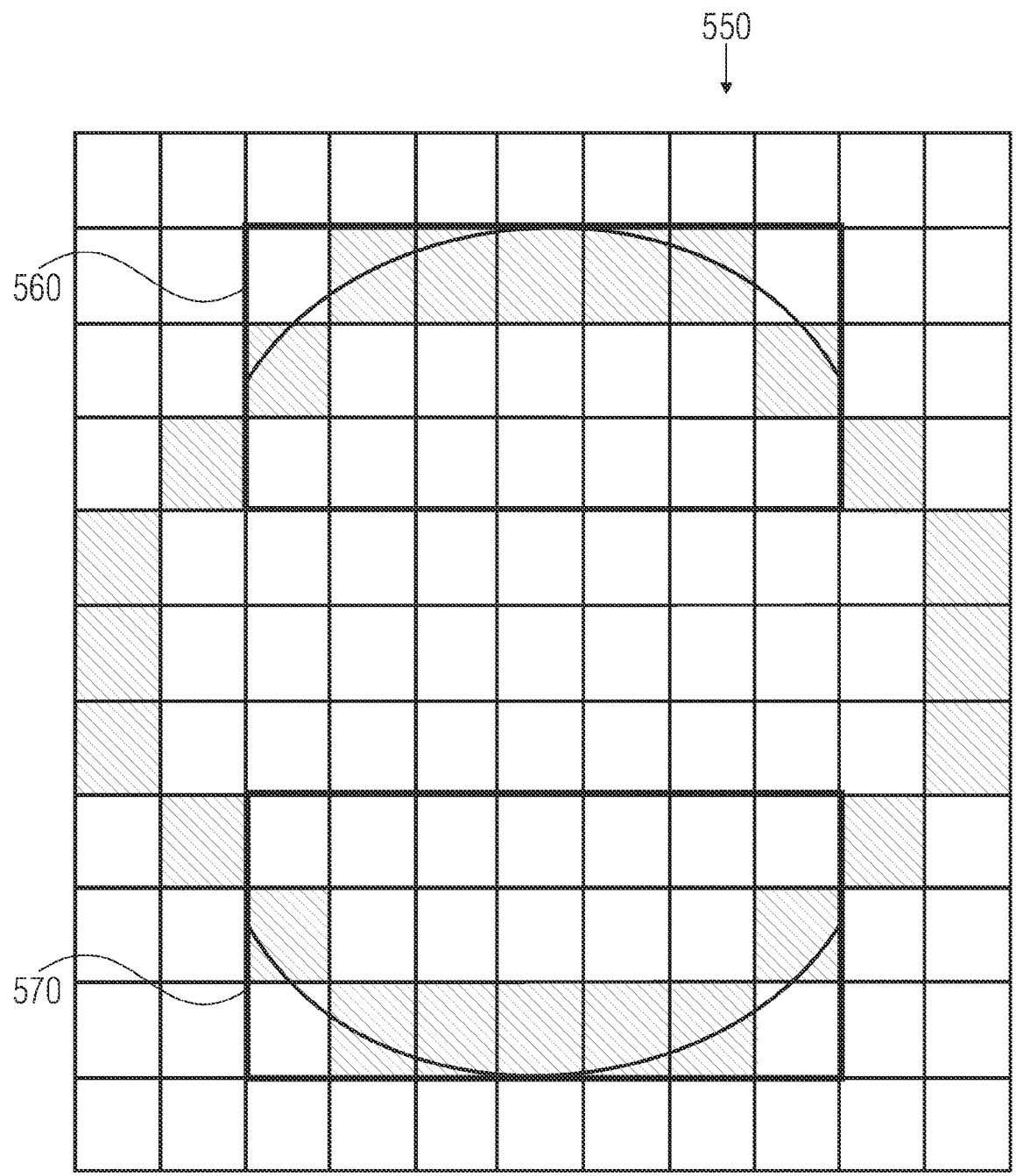
FIG. 3b shows a second graphical representation of an exemplary raster image having detected bent line segments marked therein.

It shall also be noted that FIG. 3b depicts a second graphical representation of an exemplarily raster image having detected bent line segments marked therein. The detected bent line segments, which in the graphical representation 550 of FIG. 3b are designated by 560 and 570, here correspond to the reference course of curve depicted in the graphical representation 454.

It shall also be noted that it is advantageous to supply a raster image 310 to the pattern detection means 420 on a column-by-column basis for the first time, starting with the first raster column 322, and to supply the raster image 310 to the pattern detection means 420 on a column-by-column basis for the second time, starting with the last raster column 340. In a first run, which starts with the first raster column 322, courses of curve of a first direction of curvature may be detected, while in the second run, which starts with the last raster column 340, courses of curve having a direction of curvature which is opposite thereto are detected. Similarly, line-by-line processing of the raster image 310 may be performed starting with the first raster line 320 at one point and starting with the last raster line 334 at another point so as to be able to identify, in turn, courses of curve having different curvature behaviors while using a pattern detection means which is designed only to detect courses of curve having one single curvature behavior or one single direction of curvature.

Figure 4:
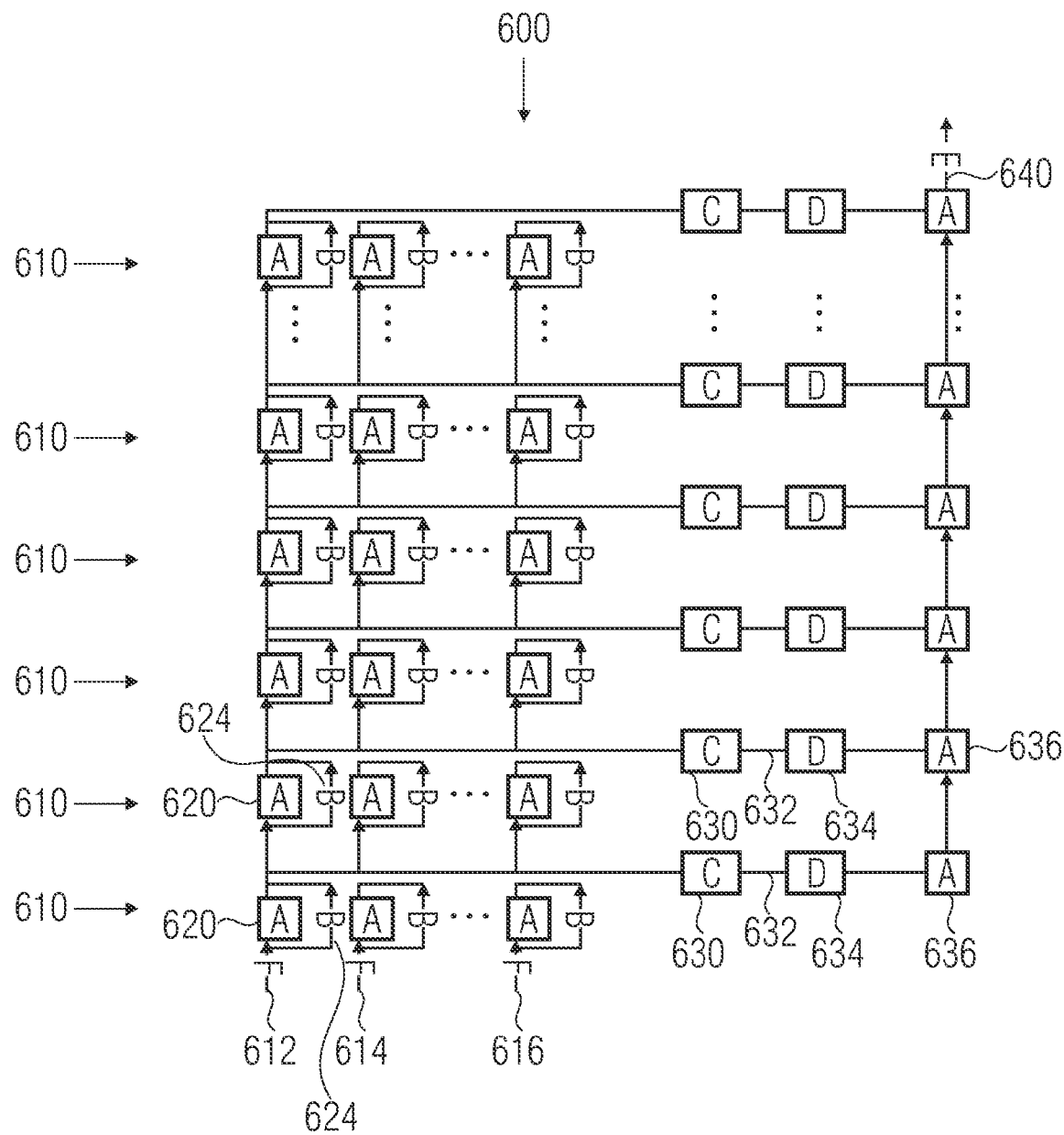
FIG. 4 shows a block diagram of a pattern detection means for utilization in an inventive device for determining information about a shape and/or a location of an ellipse in a graphic image.

FIG. 4 shows a block diagram of a pattern detection means for utilization in an inventive device 400. The circuit of FIG. 4 is designated by 600 in its entirety and describes a so-called "Hough array" for performing a Hough transform. The pattern detection means 400, which implements the coordinate determination means 110, may advantageously conduct a search for circular curves having different radii which describe, with sufficient approximation, an ellipse to be identified around the extreme points, i.e. around the first ellipse point, the second ellipse point, the third ellipse point, or the fourth ellipse point. This may be conducted, in a particularly advantageous manner, by a parallel systolic Hough transform. The Hough transform may be configured for circular curves, and may be adapted, in this context, to the search for extreme values, i.e. for identifying those points which are located farthest in a specific direction.

FIG. 4 shows a particularly advantageous means for performing a Hough transform. The means 600 for performing a Hough transform here comprises a plurality of stages 610 connected in series, by means of which several signals 612, 614, 616 are passed on in parallel. For each signal, a stage contains either a delay element 620, also designated by A, or a bypass 624, also designated by B. In addition, the signals at the output of a stage are supplied to a summing component 630, also designated by C. The summing component is advantageously implemented to establish how many signals are active at the same time at the output of the respective stage. A so-called sum of lines is present at an output 632 of a summing component 630, said sum of lines indicating the number of signals which are active at the same time at the output of the respective stage. The sum of lines 632 may then be supplied to a comparator 634, which compares the sum of lines 632 with a predefined threshold value. If the sum of lines 632 exceeds the predefined threshold value, this will mean that at least a predefined number of signals are active at the respective stage. In other words, a "straight line" is present, at least approximately, at the respective stage, said straight line being characterized in that at least a predefined number of signals of the respective stage are active at the same time. Subsequently, an output signal of the comparator 634 is supplied to a delay element 636. Several delay elements 636, each of which is connected to an output of a comparator 634 of a stage 610, are cascade-connected such that the output signal of a delay element 636 is supplied to the input of a subsequent delay element 636.

It shall further be noted that the delay elements 620, 636 operate in a clocked manner, so that both the signals 612, 614, 616 and the output signals of the comparators 634 are passed on in a clocked manner. The signals 612, 614, 616 and the output signals of the comparators 634 are passed on in parallel, in terms of their structure, and in the same direction, however the signals 612, 614, 616 being delayed to different degrees at the individual stages, depending on whether a delay element 620 or a bypass 624 is used for passing on the signal 612, 614, 616 at a stage 610. However, it is advantageous that a central signal of the plurality of signals 612, 614, 616 be forwarded, through the plurality of stages, as fast as the signals from the outputs of the comparators 634. Advantageously, the central signal is delayed by the same amount at each of the stages, and the output signals of the comparators 634 are also advantageously forwarded through the stages with a constant delay. The central signal is advantageously located approximately half way between the first signal 612 and the last signal 614, thus describes a raster line in the middle of the image section supplied to the Hough transform means 600, or is spaced apart from the center of the image section by a maximum of 25% of a width of the image section. The width of the image section is defined by the number of raster lines or raster columns which are supplied to the Hough transform means 600 at the same time.

On the basis of the structural description, the mode of operation of the pattern detection means 600 will be described in more detail below. It shall be assumed that an image section is supplied to the Hough transform means 600 in the form of parallel time signals 612, 614, 616. The delay elements 620 or the bypasses 624 are configured such that different time signals 612, 614, 616 are delayed by various degrees when they pass through the individual stages. By switching on delay elements 620 or bypasses 624, the delays are set such that a bent course of curve (advantageously a circular bent course of curve) is unbent after passing through one stage or several stages 610. In other words, a bent course of curve in the image section processed by the Hough transform means results in that the individual signals 612, 614, 616 are active at different points in time. However, suitably setting the delay elements 620 or the bypasses 624 may achieve that signals 612, 614, 616 pass through the individual stages at different speeds, so that ideally, any forwarded signals which are based on the signals 612, 614, 616 will be active at the output of a stage at the same time once a specific number of stages 610 have been passed through. In this case, a particularly large sum of lines occurs at the specific stage, said sum of lines being calculated by the respective summing means 630. An occurrence of such a large sum of lines may result in that the comparator 634 of the respective stage outputs an active signal which in turn is forwarded, via the cascade of delay elements 636, to the output 640 of the Hough transform means. Thus, a location of a course of curve in the image section which is input to the Hough transform means 600 in the form of time signals 612, 614, 616 may be inferred from a temporal position of an activity on the output signal at the output 640 of the Hough transform means 600.

It shall also be noted that it is advantageous that a predefined signal (also referred to as a central signal) among the signals 612, 614, 616 pass through the stages 610 of the Hough transform means 600 as fast as an output signal from the outputs of the comparators 634 which is forwarded by the chain of delay elements 636. In other words, at least one of the input signals 612, 614, 616 propagates in parallel and at the same speed as the output signals of the comparators 634. In this manner, one may achieve that the output signal which is present at the output 640 of the Hough transform means 600 and which is based on the signals of the comparators 634 which are forwarded in the cascade of delay elements 636, bears a direct statement on the point in time of the occurrence of a bent line segment in the input signals 612, 614, 616. In this context, the point in time of the occurrence of an activity on the output signal at the output 640 of the Hough transform means 600 provides a statement on the point in time when a bent course of line was input into the Hough transform means in the form of input signals 612, 614, 616. The point in time of the presence of a bent course of sample in the signals 612, 614, 616 obviously allows direct conclusions to be drawn as to a spatial locations of the bent course of curve in the raster image underlying the signals 612, 614, 616.

In addition, it shall be noted that with the configuration indicated, wherein at least one of the signals 612, 614, 616 propagates through the stages 610 as fast as the output signals of the comparators 634, the exact shape of the curvature, i.e. the curvature radius, for example, in a bent curve only has an influence as to which of the stages 610 a comparator 634 becomes active in. However, in the configuration shown, the precise shape of the bent course of curve has no influence on the point in time when an activity occurs at the output 640 of the Hough transform means 600.

It may therefore be established that the Hough transform means 600 shown in FIG. 4 is suited to determine the location of a bent course of curve in a raster image in a very efficient manner in that the raster image (or a section thereof) is converted to a plurality of parallel signals which will then pass through several stages of the Hough transform means 600 at different speeds. By forming a sum of columns at the outputs of the stages 610, one may detect when at least a predefined number of signals are active at the outputs of the stages at the same time, which again indicates that the original course of curve has been "unbent".

Advantageously, the Hough transform means 600 is designed, by suitably selecting delay elements 620 or bypasses 624, to unbend any courses of curve which are described by signals 612, 614, 616 and which may approximate the ellipse at the first ellipse point, the second ellipse point, the third ellipse point, or the fourth ellipse point. Also, advantageously, only such courses of curve which may approximate an ellipse at the first ellipse point, the second ellipse point, the third ellipse point, or the fourth ellipse point will be unbent. Thus, the Hough transform means 600 of FIG. 4 is suited to identify the first bent line segment, the second bent line segment, the third bent line segment, or the fourth bent line segment. The point in time when an output signal is present at the output 640 of the Hough transform means 600 describes a location of the identified course of curve in the raster image on which the signals 612, 614, 616 are based, i.e. a parameter of the first bent line segment, the second bent line segment, the third bent line segment, or the fourth bent line segment.

Figure 5A:
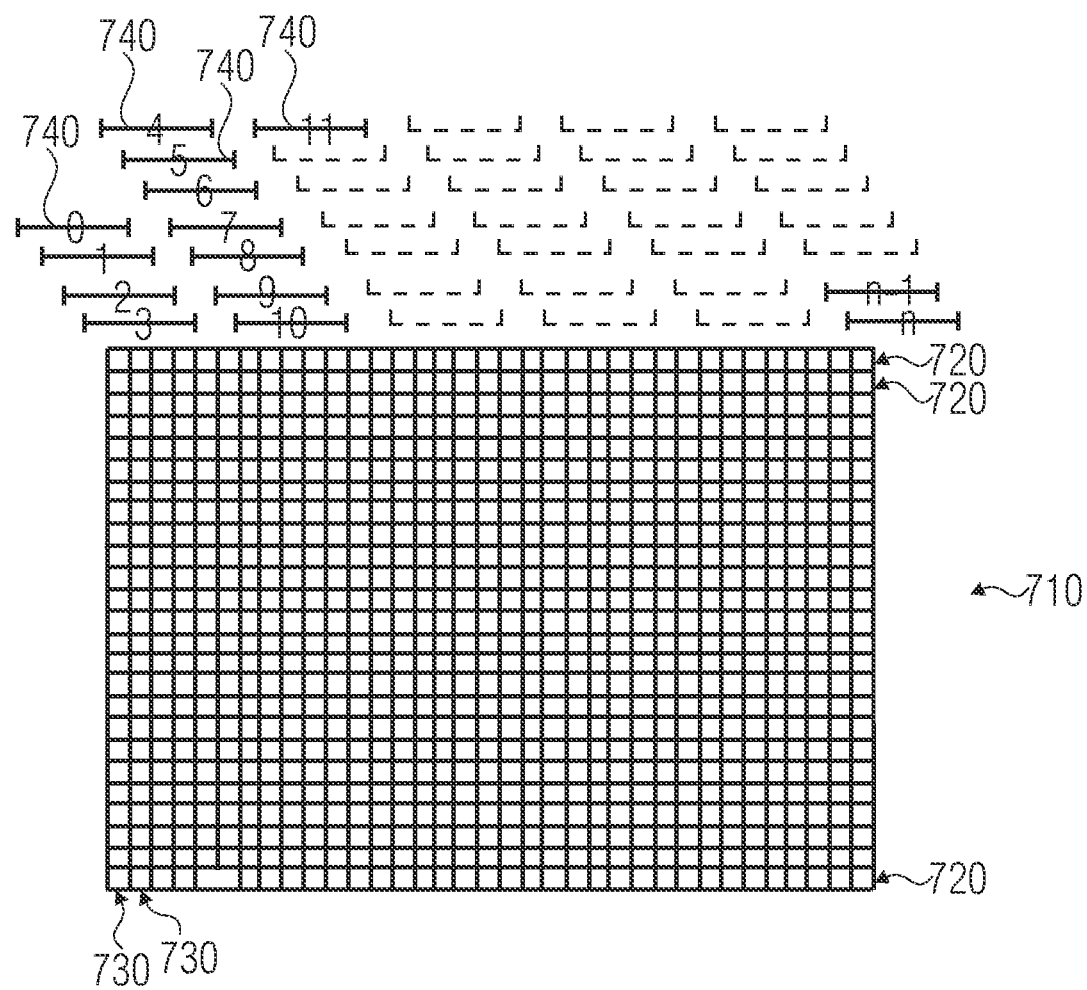
FIG. 5a shows a graphical representation of a procedure for moving a graphic image through the pattern detection means in accordance with FIG. 4.

FIG. 5a shows a graphical representation of an approach of moving a graphic image through a pattern detection means. Specifically, FIG. 5a shows moving an image or raster image through the Hough transform means 600 shown in FIG. 4 (also referred to as a Hough array) on a column-by-column basis.

FIG. 5a shows a raster image 710 consisting of a plurality of raster lines 720 and a plurality of raster columns 730. What is also shown are groups 740 of advantageously five raster columns 730 each, it being assumed that five raster columns in each case being supplied, at the same time, to the Hough transform means 600 in parallel in the form of signals 612, 614, 616. For further details, reference shall be made to the graphical representation 300 of FIG. 1.

Figure 5B:
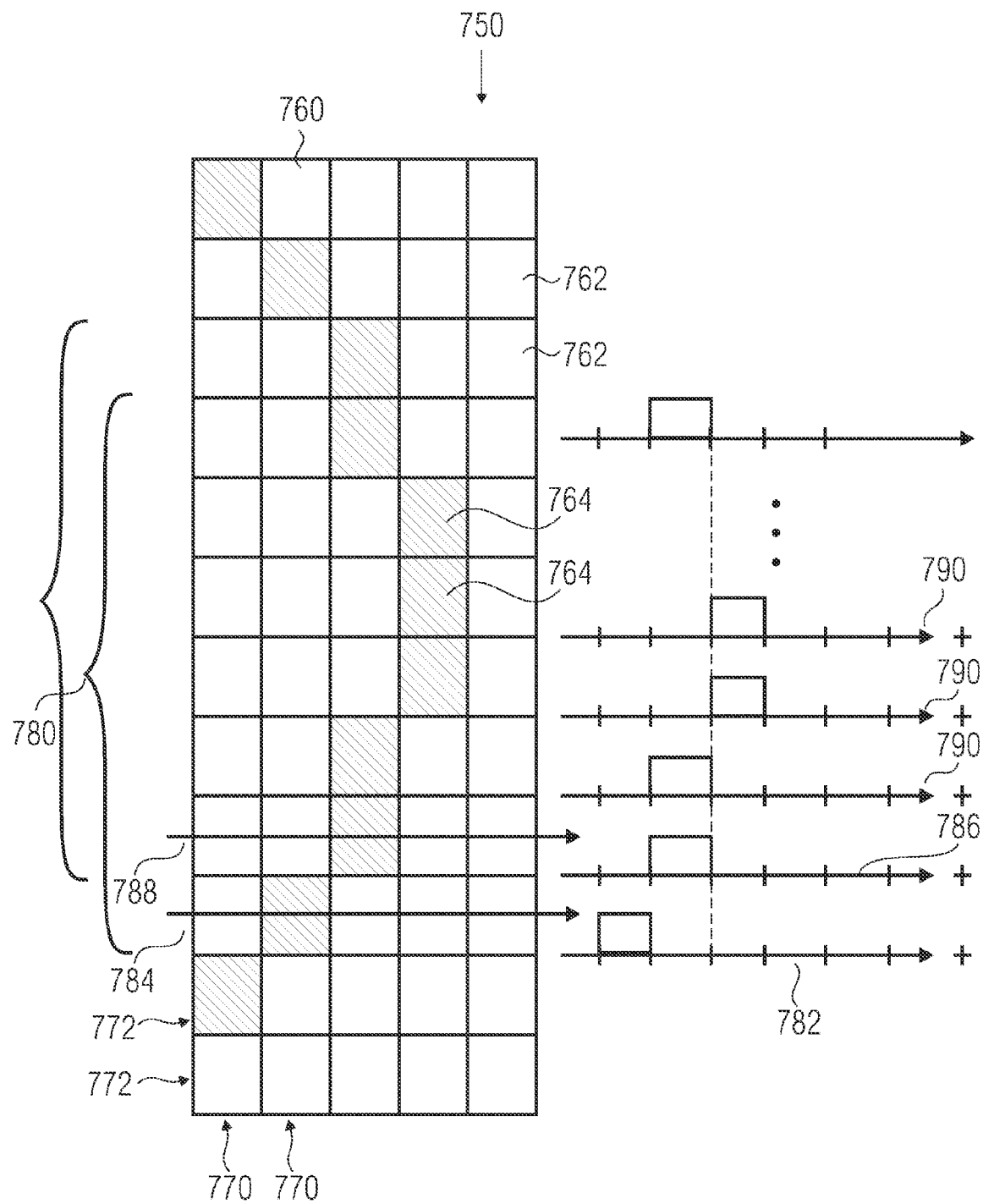
FIG. 5b shows a graphical representation of time signals which result during the conversion of a raster image to parallel time signals.

FIG. 5b shows a graphical representation of time signals which are formed during a conversion of a raster image to parallel time signals. The graphical representation of FIG. 5b is designated by 750 in its entirety. The graphical representation 750 shows a raster image 760 comprising a plurality of inactive raster points or image points 762 and a plurality of active raster points or image points 764 which are marked by hatching. The active raster points or image points 764 advantageously describe a course of curve. As was already described above, the raster image 760 comprises a plurality of raster lines 770 and a plurality of raster columns 772. It is also assumed that time signals are formed on the basis of an image section 780 comprising a group of seven raster columns. For example, a first time signal 782 is associated with a first raster column 784 contained within the group 780 of raster columns. The time signal 782 here is formed by scanning the raster image 760 along the associated raster column 784 on a line-by-line basis. Similarly, a second time signal 786 is formed by scanning the second raster column 788 among the group 780 of raster columns on a line-by-line basis. Observation of the time behaviors clearly shows that in the scanning direction described, active raster points located in the same raster line of the raster image 760 result in simultaneous activity pulses on the time signals 782, 786, 790. A horizontal line, that is, a line extending within a raster line, thus becomes noticeable in the time signals 782, 786, 790 by simultaneous pulses on the time signals 782, 786, 790.

If it is assumed that the time signals 782, 786, 790 are supplied to a Hough transform means 600 as input signals 612, 614, 616, and that the signals 612, 614, 616 are delayed to different degrees at individual stages 610 of the Hough transform means 600, it becomes clear that the delay of the time signals 782, 786, 790, which is effected to varying degrees, corresponds to a distortion of the raster image 760, as a result of which a bent course of curve may be bent into a straight line. However, a straight line which corresponds to simultaneous activity of several of the time signals 782, 786, 790 may be detected in the Hough transform means 600, as was described above.

Utilization of a Hough transformer for determining elements of writing enables, as was already mentioned above, realizing a particularly reliable detection of writing system.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for detecting characters in an image, comprising:
   a Hough transformer arranged to identify, as identified elements of writing, circular arcs or elliptical arcs in the image or in a preprocessed version of the image;
   a character description generator arranged to acquire, on the basis of the identified circular arcs or elliptical arcs, a character description which describes locations of the identified circular arcs or elliptical arcs; and a database comparator arranged to compare the character description with a plurality of comparative character descriptions which have character codes associated with them, so as to provide, as a result of the comparison, a character code of a detected character; wherein the Hough transformer is arranged to identify, as identified elements of writing, individual circular arcs or elliptical arcs, which approximate a course of line of a character within a surrounding of local extremes, in the image or in a preprocessed version of the image, and to provide information about an orientation of an identified circular arc or elliptical arc; and the character description generator is arranged to acquire, based on the identified circular arcs or elliptical arcs and the information about the orientation, a character description which describes locations of the individual identified circular arcs or elliptical arcs.

2. The device according to claim 1, wherein the character description of an arc comprises information indicating whether the arc is curved upward, downward, to the left or to the right.

3. The device according to claim 1, wherein the Hough transformer is arranged to provide, when detecting a circular arc or elliptical arc, information about an extreme point of the circular arc or elliptical arc; and wherein the character description describes a position of the extreme point.

4. The device according to claim 1, wherein an extreme point of an arc is a point of the arc which is located farthest in a predefined direction.

5. The device according to claim 1, wherein the Hough transformer is arranged to identify a plurality of straight line sections, which run through the image in different directions, as identified elements of writing.

6. The device according to claim 5, wherein the Hough transformer is arranged to provide information about a location, a length or a direction of an identified straight line section, and wherein the character description generator is arranged to use the information, provided by the Hough transformer, about the identified straight line section for producing the character description.

7. The device according to claim 1, wherein the character description generator is arranged to acquire, as the character description, a description of a character which describes the character as an ordered description of identified elements of writing.

8. The device according to claim 7, wherein the character description generator is arranged to order the character description in such a manner that the ordered arranged of identified elements of writing describe a continuous line of writing.

9. The device according to claim 1, wherein the Hough transformer is arranged to provide information about a location, an arc length, a radius of curvature or an angle of curvature of the identified circular arcs or elliptical arcs, and wherein the character description generator is arranged to utilize the information provided by the Hough transformer about the location, the arc length, the radius of curvature or the angle of curvature of the identified circular arcs or elliptical arcs for generating the character description.

10. The device according to claim 1, wherein the character description generator is arranged to generate the character description in such a manner that the character description comprises a description of relative locations of circular arcs or elliptical arcs belonging to a character.

11. The device according to claim 1, wherein the device comprises a line-of-writing detector arranged to identify, on the basis of locations of the elements of writing identified by the Hough transformer, a line along which the detected characters are arranged.

12. The device according to claim 11, wherein the line-of-writing detector is arranged to determine, as a line of writing, a lower line, a base line, a center line, or an upper line of characters on the basis of locations of the elements of writing identified by the Hough transformation.

13. The device according to claim 11, wherein the line-of-writing detector is arranged to determine, as a line of writing, a line on which more than a predefined number of extremes of identified circular arcs or elliptical arcs are located.

14. The device according to claim 11, wherein the character description generator is arranged to generate the character description in such a manner that the character description describes information about locations of the identified elements of writing in relation to at least one detected line of writing.

15. The device according to claim 1, wherein the character description generator is arranged to receive, into the character description for identified circular arcs or elliptical arcs, information provided by the Hough transformer about an orientation of the circular arc or of the elliptical arc.

16. The device according to claim 1, wherein the character description generator is arranged to receive, into the character description for identified circular arcs or elliptical arcs, information provided by the Hough transformer about a position of an extreme point of the identified circular arc or of the identified elliptical arc.

17. The device according to claim 1, wherein the Hough transformer is arranged to identify only such circular arcs or elliptical arcs whose radii of curvature are smaller, in terms of amount, than a predefined maximum admissible radius of curvature.

18. The device according to claim 1, wherein the character description generator is arranged to generate a description of the character by joining together selected adjacent identified character elements, wherein the character description generator is arranged to select the selected adjacent identified character elements employed for the description of the character from a totality of identified character elements such that the selected adjacent identified character elements describe a continuous course of line from a predefined starting point to a predefined end point.

19. The device according to claim 1, wherein the character description generator is arranged to generate, on the basis of identified character elements, a feature vector describing successive portions of a character.

20. The device according to claim 1, wherein the database comparator is arranged to compare a feature vector, which comprises the information of the character description, to a plurality of comparative feature vectors associated with comparative characters, so as to acquire a measure of differences between the feature vector and the comparative vectors, and to determine, on the basis of the measure of the differences, a character code belonging to the feature vector.

21. The device according to claim 1, wherein the device comprises an edge detector arranged to detect edges in the image and to generate, on the basis of the image, an edge image as the preprocessed version of the image.

22. The device according to claim 1, wherein the device comprises a letter separator arranged to provide or to mark, for detection of a character, a section of the image which comprises only one character.

23. The device according to claim 1, wherein the device comprises a connectivity number calculator arranged to calculate a Euler connectivity number on the basis of an image content of an image section of the image which comprises one character; and
wherein the device further comprises a connectivity number examiner arranged to compare the Euler connectivity number calculated for the image section to a predefined comparative connectivity number comprised in a database and associated with a character detected in the image section, so as to acquire reliability information carrying information about a reliability of a detection of a character.

24. A method of detecting characters in an image, comprising:
Hough transforming the image or a preprocessed version of the image so as to identify, as identified elements of writing, circular arcs or elliptical arcs in the image or in a preprocessed version of the image;
producing a character description on the basis of the identified circular arcs or elliptical arcs, the character description describing locations of the identified circular arcs or elliptical arcs; and
comparing the character description with a plurality of comparative character descriptions having character codes associated with them, so as to provide, as a result of the comparison, a character code of a detected character; wherein
the Hough transforming comprises identifying, as identified elements of writing, individual circular arcs or elliptical arcs, which approximate a course of line of a character in a surrounding of local extremes, in the image or in a preprocessed version of the image; and
the method further comprises:
providing information about an orientation of an identified circular arc or elliptical arc; and
producing a character description describing locations of the individual identified circular arcs or elliptical arcs on the basis of the identified circular arcs or elliptical arcs and of the information about the orientation.

25. A non-transitory computer readable medium having a computer program for performing, when the computer program runs on a computer, the method of detecting characters in an image, the method comprising:
Hough transforming the image or a preprocessed version of the image so as to identify, as identified elements of writing, circular arcs or elliptical arcs in the image or in a preprocessed version of the image;
producing a character description on the basis of the identified circular arcs or elliptical arcs, the character description describing locations of the identified circular arcs or elliptical arcs; and
comparing the character description with a plurality of comparative character descriptions having character codes associated with them, so as to provide, as a result of the comparison, a character code of a detected character; wherein
the Hough transforming comprises identifying, as identified elements of writing, individual circular arcs or elliptical arcs, which approximate a course of line of a character in a surrounding of local extremes, in the image or in a preprocessed version of the image; and
the method further comprises:
providing information about an orientation of an identified circular arc or elliptical arc; and
producing a character description describing locations of the individual identified circular arcs or elliptical arcs on the basis of the identified circular arcs or elliptical arcs and of the information about the orientation.

26. A device for detecting characters in an image, comprising:
a Hough transformer arranged to identify, as identified elements of writing, circular arcs or elliptical arcs in the image or in a preprocessed version of the image;
a character description generator arranged to acquire, on the basis of the identified circular arcs or elliptical arcs, a character description which describes locations of the identified circular arcs or elliptical arcs;
a database comparator arranged to compare the character description with a plurality of comparative character descriptions which have character codes associated with them, so as to provide, as a result of the comparison, a character code of a detected character;
a connectivity number calculator arranged to calculate a Euler connectivity number based on an image content of an image section of the image which comprises one character; and
a connectivity number examiner arranged to compare the Euler connectivity number calculated for the image section to a predefined comparative connectivity number in a database and associated with a character detected in the image section, so as to acquire reliability information carrying information about a reliability of a detection of a character.

27. A method of detecting characters in an image, comprising:
Hough transforming the image or a preprocessed version of the image so as to identify, as identified elements of writing, circular arcs or elliptical arcs in the image or in a preprocessed version of the image;
producing a character description based on the identified circular arcs or elliptical arcs, the character description describing locations of the identified circular arcs or elliptical arcs;
comparing the character description with a plurality of comparative character descriptions having character codes associated with them, so as to provide, as a result of the comparison, a character code of a detected character;
calculating a Euler connectivity number based on an image content of an image section of the image which comprises one character; and
comparing the Euler connectivity number calculated for the image section to a predefined comparative connectivity number in a database and associated with a character detected in the image section, so as to acquire reliability information carrying information about a reliability of a detection of a character.

28. A non-transitory computer readable medium having a computer program for performing, when the computer program runs on a computer, a method of detecting characters in an image, the method comprising:
Hough transforming the image or a preprocessed version of the image so as to identify, as identified elements of writing, circular arcs or elliptical arcs in the image or in a preprocessed version of the image;

producing a character description based on the identified circular arcs or elliptical arcs, the character description describing locations of the identified circular arcs or elliptical arcs;

comparing the character description with a plurality of comparative character descriptions having character codes associated with them, so as to provide, as a result of the comparison, a character code of a detected character;

calculating a Euler connectivity number based on an image content of an image section of the image which comprises one character; and comparing the Euler connectivity number calculated for the image section to a predefined comparative connectivity number comprised in a database and associated with a character detected in the image section, so as to acquire reliability information carrying information about a reliability of a detection of a character.

* * * * *